US012801056B2

(12) United States Patent
Masuda et al.

(10) Patent No.: US 12,801,056 B2
(45) Date of Patent: Nov. 17, 2026

(54) IMAGE FORMING METHOD, CARRIER, DEVELOPER, AND IMAGE FORMING APPARATUS

(71) Applicants: Minoru Masuda, Shizuoka (JP); Masashi Nagayama, Shizuoka (JP); Tohru Suganuma, Shizuoka (JP); Kento Takeuchi, Shizuoka (JP); Tomomi Suzuki, Shizuoka (JP)

(72) Inventors: Minoru Masuda, Shizuoka (JP); Masashi Nagayama, Shizuoka (JP); Tohru Suganuma, Shizuoka (JP); Kento Takeuchi, Shizuoka (JP); Tomomi Suzuki, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 354 days.

(21) Appl. No.: 18/586,597

(22) Filed: Feb. 26, 2024

(65) Prior Publication Data

US 2024/0302763 A1 Sep. 12, 2024

(30) Foreign Application Priority Data

Mar. 9, 2023 (JP) ................................ 2023-036125

(51) Int. Cl.
*G03G 9/113* (2006.01)
*G03G 15/095* (2006.01)

(52) U.S. Cl.
CPC ......... *G03G 9/1139* (2013.01); *G03G 15/095* (2013.01); *G03G 2215/0607* (2013.01)

(58) Field of Classification Search
CPC ............... G03G 9/1139; G03G 15/095; G03G 2215/0607
See application file for complete search history.

(56) References Cited

U.S. PATENT DOCUMENTS

| | | | | |
|---|---|---|---|---|
| 2004/0101776 | A1* | 5/2004 | Yanagida | G03G 15/0928 430/110.3 |
| 2008/0152393 | A1 | 6/2008 | Nagayama et al. | |
| 2009/0180813 | A1 | 7/2009 | Yoneda et al. | |
| 2013/0004209 | A1* | 1/2013 | Kishida | G03G 9/1075 399/277 |
| 2018/0329331 | A1* | 11/2018 | Kurano | G03G 9/1133 |

(Continued)

FOREIGN PATENT DOCUMENTS

| | | | |
|---|---|---|---|
| JP | S59-100471 A | | 6/1984 |
| JP | H11202560 A | * | 7/1999 |

(Continued)

OTHER PUBLICATIONS

English machine translation of the description of JP-H11202560-A (Year: 1999).*

(Continued)

*Primary Examiner* — Boone Alexander Evans
(74) *Attorney, Agent, or Firm* — XSENSUS LLP

(57) ABSTRACT

An image forming method is provided that includes: developing an electrostatic latent image formed on an image bearer, with use of a developer containing a carrier and toner, the carrier having a core material particle and a covering layer, the covering layer covering the core material particle and containing an antimony-containing particle; and supplying the carrier to the developer.

20 Claims, 10 Drawing Sheets

(56) References Cited

U.S. PATENT DOCUMENTS

| | | | |
|---|---|---|---|
| 2020/0319571 | A1 | 10/2020 | Takeuchi et al. |
| 2022/0187729 | A1 | 6/2022 | Nagayama et al. |
| 2022/0283523 | A1 | 9/2022 | Nagayama et al. |
| 2022/0291603 | A1 | 9/2022 | Kishida et al. |
| 2022/0291604 | A1 | 9/2022 | Suzuki et al. |
| 2023/0195004 | A1 | 6/2023 | Masuda |
| 2023/0205108 | A1 | 6/2023 | Masuko et al. |
| 2023/0305439 | A1 | 9/2023 | Nagayama et al. |

FOREIGN PATENT DOCUMENTS

| | | | | |
|---|---|---|---|---|
| JP | 2007248614 | A | * | 9/2007 |
| JP | 2008-262155 | A | | 10/2008 |
| JP | 2010-085958 | A | | 4/2010 |

OTHER PUBLICATIONS

English machine translation of the description of JP-2007248614-A (Year: 2007).*
Bareš, Jan, et al. Color Hard Copy and Graphic Arts II: Feb. 1-4, 1993, San Jose, California. illustrated ed., SPIE, 1993, Feb. 1993, pp. 38-46. (Year: 1993).*
U.S. Appl. No. 18/326,888, filed May 31, 2023.
U.S. Appl. No. 18/506,417, filed Nov. 10, 2023.

* cited by examiner

IMAGE FORMING METHOD, CARRIER, DEVELOPER, AND IMAGE FORMING APPARATUS

CROSS-REFERENCE TO RELATED APPLICATION

This patent application is based on and claims priority pursuant to 35 U.S.C. § 119(a) to Japanese Patent Application No. 2023-036125, filed on Mar. 9, 2023, in the Japan Patent Office, the entire disclosure of which is hereby incorporated by reference herein.

BACKGROUND

Technical Field

The present disclosure relates to an image forming method, a carrier, a developer, and an image forming apparatus.

Related Art

Conventional developing devices in image forming apparatuses have employed one-component development systems that perform development with toner particles containing a magnetic material, or two-component development systems that perform development with a developer containing toner particles and carrier particles. Particularly, in view of providing good development, two-component development systems have been mainly used in current image forming apparatuses. Notably, in recent years, two-component development systems have been majorly employed for color image forming apparatuses to form a full-color or multi-color image, and there has been further increased demand for developing devices with two-component development systems.

SUMMARY

An image forming method according to an embodiment of the present invention includes: developing an electrostatic latent image formed on an image bearer, with use of a developer containing a carrier and toner, the carrier having a core material particle and a covering layer, the covering layer covering the core material particle and containing an antimony-containing particle; and supplying the carrier to the developer.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
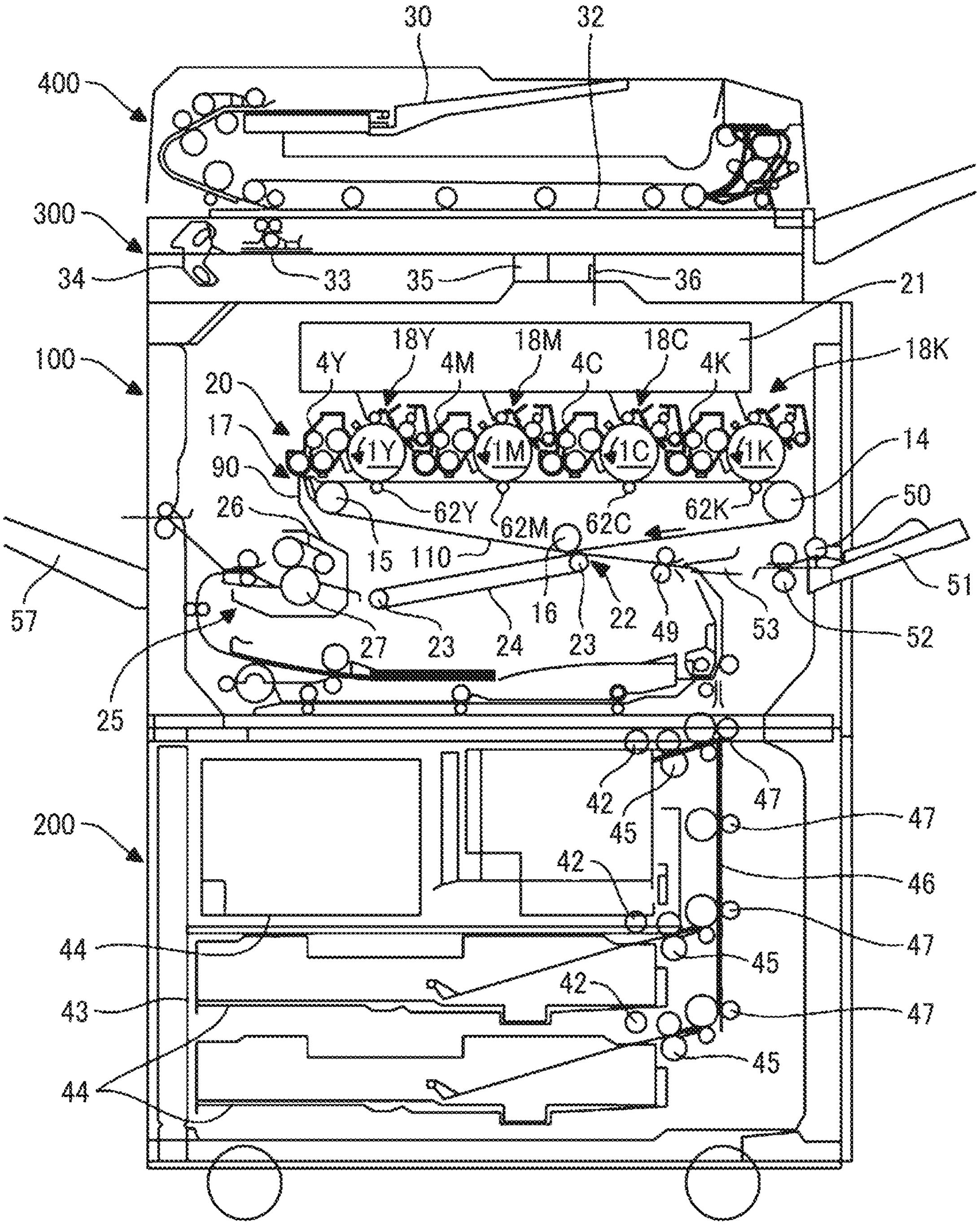
FIG. 1 is a schematic view of an image forming apparatus according to an embodiment of the present invention.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to embodiments of the present invention, an image forming method is provided that prevents the occurrence of scattering of toner, image fog, and carrier deposition for a long term.

Generally, two-component development is performed in accordance with the following processes.

In a developing device, toner particles and carrier particles are stirred to generate friction that causes the toner particles to receive electric charge from the carrier particles. The charged toner particles attach electrostatically onto surfaces of carrier particles and are conveyed to a development area. Under a condition of application of developing bias, the toner particles separate from the carrier particles and attach electrostatically onto a latent image portion on an image bearer, thereby forming a toner image.

In formation of an image by two-component development, it is preferred to stabilize electrostatic charge provided from carrier particles to toner particles during stirring the toner particles and the carrier particles, in order to provide an image with high durability and good stability for long-term use.

Moreover, it is also preferred to appropriately reduce resistance of a carrier for the purpose of obtaining an image with uniform image density by two-component development. When the carrier has high resistance, an electric field is distorted during development, sometimes resulting in a dark edge in an image formed, i.e., reduction in uniformity of image density. Accordingly, it is desirable to approximately reduce resistance of a carrier in image formation.

However, conventional image forming methods with two-component development have had a problem in that resistance of carrier particles and electrostatic charge of a developer are excessively reduced and thereby causes failure, such as scattering of toner and image fog, in image formation. Details are as follows.

While toner particles are continuously consumed by a developing process, carrier particles remain in a developing tank rather than being consumed. Thus as the number of stirring of toner particles and carrier particles is increased, several events are likely to occur, such as peeling of a resin covering layer coating a surface of a carrier particle and fusion of a toner particle to a surface of a carrier particle, thus excessively reduce resistance of carrier particles and electrostatic charge of a developer, and thereby lead to failure such as scattering of toner, image fog, and carrier deposition.

Furthermore, carrier particles having excessively reduced resistance can be developed together with toner in formation of an image having a wide area. Specifically, in transfer of a toner image from a photoconductor to a recording medium or the like, the carrier particles developed together with toner particles may act as spacers, resulting in failure called as "carrier deposition", which forms white dots on an image. A reason of this failure is that upon excessive reduction in resistance of a carrier having a charge opposite to toner particles, an electric field during development injects electric charge into the carrier and thereby provides the carrier with the same charge as the toner particles.

The inventors earnestly investigated and found that formation of a covering layer containing an antimony-containing particle on a surface of a carrier core material particle prevents the occurrence of scattering of toner, image fog, and carrier deposition for a long period. Details are as follows.

The antimony-containing particle has semi-conductivity, and can appropriately adjust resistance of a carrier particle. Thus it is possible to prevent excessive reduction in resistance of the carrier particle and avoid failure such as scattering of toner and image fog.

As described above, a carrier may contain a resistance adjuster such as carbon black for the purpose of appropriately reducing resistance of the carrier. In a conventional carrier containing a resistance adjuster, as described above, a resin covering layer coating a carrier core material particle peels to cause a resistance adjuster, a base particle having magnetism, etc. to be exposed on a surface of the carrier particle, thereby changing resistance of a carrier. By contrast, in the present disclosure, inclusion of antimony-containing particles in a covering layer prevents significant reduction in resistance and thus enables prevention of carrier deposition, even when a covering resin layer is shaved to cause an antimony-containing particle, a base particle, etc. to be exposed.

Embodiments of the present invention will now be described in detail below.

(Image Forming Method and Image Forming Apparatus)

The image forming method according to the present embodiment includes: a developing process to develop an electrostatic latent image formed on an image bearer, with use of a developer containing a carrier and toner, the carrier having a core material particle and a covering layer, the covering layer covering the core material particle and containing an antimony-containing particle; and a carrier supplying process to supply the carrier to the developer. The method may have, as appropriate, a developer discharging process to discharge an excess of the developer and another process.

The image forming apparatus according to the present embodiment includes: a developing unit containing a developer to develop an electrostatic latent image formed on an image bearer, with use of the developer, the developer containing a carrier and toner, the carrier having a core material particle and a covering layer, the covering layer covering the core material particle and containing an antimony-containing particle; and a carrier supplying unit to supply the carrier to the developer. The apparatus may have, as appropriate, a developer discharging unit to discharge an excess of the developer and another unit.

The image forming method can be preferably performed by the image forming apparatus.

As described in detail later, the image forming method according to the present embodiment is a method of forming an image along with supplying a developer containing toner and a carrier to a developing device (developing unit) and as appropriate, discharging a developer present as an excess in the developing device; and is an image forming method in which a covering layer of the carrier contains at least an antimony-containing particle, thereby preventing the occurrence of scattering of toner, image fog, and carrier deposition for a long period. In other words, by supplying a fresh developer (hereinafter sometimes referred to as "supply developer") to the developing device, and as appropriately, discharging an excess of the developer from the developer (hereinafter sometimes referred to as "excess developer"), a carrier deteriorated in the developing device is replaced with a carrier freshly supplied, thus stably maintaining electrostatic charge for a long period and enabling stable formation of an image.

As used herein, the term "a long period" means, e.g., a term until 200,000 sheets of a black image with an image area ratio of 50% is completely output using a printer.

The image forming method according to the present embodiment is effective particularly in printing a high-quality image area (in printing a high-definition image on a wide area).

In typical printing a high-quality image area, a main factor of deterioration of a carrier can be a reduced charge of a carrier due to toner spending on the carrier. Printing of a high-quality image area uses a large amount of a developer. By contrast, the image forming method according to the present embodiment leads to increase in the amount of a carrier supplied corresponding to consumption of a developer, and rise in frequency to replace a deteriorate carrier, thus allowing stable image formation for a long period.

<Developing Process and Developing Unit>

The developing process is a process to develop an electrostatic latent image formed on an image bearer, with use of a developer containing a carrier and toner, in which the carrier has a core material particle and a covering layer covering the core material particle and containing an antimony-containing particle.

The developing unit is a unit containing a developer to develop an electrostatic latent image formed on an image bearer, with use of the developer that contains a carrier and toner, in which the carrier has a core material particle and a covering layer covering the core material particle and containing an antimony-containing particle.

The developing process can be preferably performed by the developing unit.

The developing process may be performed simultaneously with the carrier supplying process and the developer discharging process, or each of these processes may be performed at different timing.

Examples of the developing unit include, but are not limited to, a unit that contains a developer and includes a developing device to offer toner to an electrostatic latent image in a contact or non-contact manner.

The developing device may be a monochrome developing device or a multicolor developing device.

A preferred example of the developing device is a developing device that has a stirrer to frictionally stir toner to provide charged toner, and a magnetic field generator fixed internally, and includes a developer bearer to rotate with bearing a toner-containing developer on a surface. The developing device may have, as appropriate, a developer storage, a developer collecting conveyer, a developer supplying conveyer, a developer stirring conveyer, a developer regulator, etc.

——Image Bearer——

The structure and size of the image bearer are not particularly limited and can be suitably selected from known ones. As used Herein, the image bearer may be referred to as "photoconductor".

The material of the image bearer is not particularly limited and can be suitably selected according to a purpose. Examples thereof include, but are not limited to, inorganic photoconductors such as amorphous silicon and selenium, and organic photoconductors such as polysilane and phthalopolymethine.

An amorphous silicon photoconductor to be used can be prepared by, for example, heating a substrate to 50° C. to 400° C. and forming a photoconductive layer containing a-Si (amorphous silicon) on the substrate by a film formation process such as vacuum vapor deposition, sputtering, ion plating, thermal CVD (chemical vapor deposition), optical CVD, and plasma CVD. In particular, plasma CVD, which forms an a-Si film on a substrate by decomposing a raw material gas by direct-current, high-frequency, or microwave glow discharge, is preferable.

Examples of the organic photoconductor include, but are not limited to, a multi-layer photoconductor that has, on a substrate such as an aluminum drum, a multi-layer structure where a layer containing an electric charge generating material, such as metal-free phthalocyanine or titanyl phthalocyanine, dispersed in a binder resin (electric charge generating layer), and a layer containing an electric charge transporting material dispersed in a binder resin (electric charge transporting layer) are stacked; and a monolayer photoconductor that has, on a substrate, a photoconductive layer having a monolayer structure where both an electric charge generating material and an electric charge transporting material are dispersed in a binder resin. The monolayer photoconductor can also include a photoconductive layer where a hole transporting agent and an electron transporting agent are added as electric charge transporting materials. In addition, a substratum layer may be disposed between a substrate and a multi-layer electric charge generating layer or a monolayer photoconductive layer.

The shape of the electrostatic latent image bearer is not particularly limited and can be suitably selected according to a purpose, but is preferably cylindrical. The outer diameter of a cylindrical electrostatic latent image bearer is not particularly limited and can be suitably selected according to a purpose, but is preferably 5 mm or more to 200 mm or less, more preferably 20 mm or more to 150 mm or less, and particularly preferably 30 mm or more to 100 mm or less.

The linear speed of the image bearer is preferably 200 mm/s or more.

<Carrier Supplying Process and Carrier Supplying Unit>

The carrier supplying process is a process to supply the carrier to the developer, and may include an air supplying process as appropriate.

The carrier supplying unit is a unit to supply the carrier to the developer, and may include an air supplying unit as appropriate.

The developer supplying process can be preferably performed by the developer supplying unit.

The carrier supplying process may be performed simultaneously with the developing process and the developer discharging process, or each of these processes may be performed at different timing.

In the carrier supplying process, the carrier may be supplied with the toner described later. That is, in the carrier supplying process, a developer containing the carrier and the toner described later may be supplied.

<Developer Discharging Process and Developer Discharging Unit>

The developer discharging process is a process to discharge an excess of the developer.

The developer discharging unit is a unit to discharge an excess of the developer.

The developer discharging process can be preferably performed by the developer discharging unit.

The developer discharging process may be performed simultaneously with the developing process and the carrier supplying process, or each of these processes may be performed at different timing.

<Other Processes and Other Units>

The other processes are not particularly limited and can be suitably selected according to a purpose. Examples thereof include, but are not limited to, an electrostatic latent image forming process, a transfer process, a fixing process, a cleaning process, a neutralization process, and a recycling process.

The other units are not particularly limited and can be suitably selected according to a purpose. Examples thereof include, but are not limited to, an electrostatic latent image forming unit, a transfer unit, a fixing unit, a cleaning unit, a neutralization unit, and a recycling unit.

The other processes can be preferably performed by the other units.

<<Electrostatic Latent Image Forming Process and Electrostatic Latent Image Forming Unit>>

The electrostatic latent image forming process is not particularly limited and can be suitably selected according to a purpose, as long as an electrostatic latent image is formed on an electrostatic latent image bearer. For example, the electrostatic latent image forming process may include charging a surface of the image bearer and then subjecting the charged surface to image-wise exposure.

The electrostatic latent image forming unit is not particularly limited and can be suitably selected according to a purpose, as long as an electrostatic latent image is formed on the electrostatic latent image bearer. Examples thereof include, but are not limited to, a unit having a charger to charge a surface of the electrostatic latent image bearer and an exposurer to subject the surface of the image bearer to image-wise exposure.

The electrostatic latent image forming process can be preferably performed by the electrostatic latent image forming unit.

——Charger and Charging——

The charger is not particularly limited and can be suitably selected according to a purpose. Examples thereof include, but are not limited to, a known contact charging device including a conductive or semiconductive roller, brush, film, rubber-blade or the like, and a non-contact charging device employing corona discharge of a corotron, a scorotron, or the like.

The shape of the charger may have any form such as a magnetic brush form or a fur brush form, in addition to a roller form, and can be selected according to the specification, form, and the like of the image forming apparatus.

The material, structure, and size of the charger are not particularly limited and can be suitably selected from known ones.

The charger is not limited to a contact charger, but a contact charger is preferably used in view of obtaining an image forming apparatus where a charger generates a reduced amount of ozone.

Charging in the electrostatic latent image forming process can be performed by, e.g., applying voltage to a surface of the image bearer with the charger.

——Exposurer and Exposure——

The exposurer is not particularly limited and can be suitably selected according to a purpose, as long as the exposurer performs image-wise exposure as intended to form on a surface of the image bearer charged with the charger. Examples thereof include various exposurers such as a copying optical system, a rod lens array system, a laser optical system, and a liquid crystal shutter optical system.

A light source used for the exposurer is not particularly limited and can be suitably selected according to a purpose. Examples thereof include light-emitting objects in general such as a fluorescent light, a tungsten lamp, a halogen lamp, a mercury light, a sodium light, a light emitting diode (LED), a semiconductor laser (LD), and an electroluminescence (EL). Moreover, to irradiate light in a desired wavelength range, various filters can also be used such as a sharp-cut filter, a band-pass filter, a near-infrared-cut filter, a dichroic filter, an interference filter, and a color temperature conversion filter.

The material, shape, structure, and size of the exposurer are not particularly limited and can be suitably selected from known ones.

Exposure in the electrostatic latent image forming process can be performed by subjecting a surface of the image bearer to image-wise exposure with the exposurer. The present embodiment may employ a backlight system that perform image-wise exposure from the back side of the image bearer.

<<Transfer Process and Transfer Unit>>

The transfer process is not particularly limited and can be suitably selected according to a purpose, as long as a visible image is transferred onto a recording medium. Preferred is an aspect where an intermediate transfer body is used to primarily transfer a visible image onto the intermediate transfer body and then secondarily transfer the visible image onto the recording medium.

The transfer unit is not particularly limited and can be suitably selected according to a purpose, as long as a visible image is transferred onto a recording medium. A preferable aspect has a primary-transfer unit to transfer a visible image onto an intermediate transfer body to form a composite transfer image, and a secondary-transfer unit to transfer the composite transfer image onto a recording medium.

The transfer process can be preferably performed by the transfer unit.

When the image to be secondarily transferred onto the recording medium is a color image formed of a plurality of toners having different colors, the primary-transfer unit can superimpose the color toners in sequence on the intermediate transfer body and thereby form an image on the intermediate transfer body, and then the secondary-transfer unit can secondarily transfer the image on the intermediate transfer body onto the recording medium all at once.

The intermediate transfer body is not particularly limited and can be suitably selected from known transfer bodies according to a purpose. Suitable examples thereof include a transfer belt.

The transfer unit (the primary-transfer unit and the secondary-transfer unit) preferably has at least a transfer device that releases and charges a toner image formed on the image bearer to the recording medium side. Examples of the transfer device include a corona transfer device with corona discharge, a transfer belt, a transfer roller, a pressure transfer roller, and an adhesive transfer device.

The recording medium is representatively plain paper, but is not particularly limited and can be suitably selected according to a purpose, as long as a developed, unfixed image can be freely transferred onto the recoding medium. A PET base for OHP or the like can also be used. In the present embodiment, the recording medium is also sometimes referred to as "transfer paper sheet".

<<Fixing Process and Fixing Unit>>

The fixing process is not particularly limited and can be suitably selected according to a purpose, as long as a visible image transferred to the recording medium is fixed. For example, the fixing process may be performed at every transfer to the recording medium for each color toner, or at a time for all color toners forming a stack.

The fixing unit is not particularly limited and can be suitably selected according to a purpose, as long as a transferred image transferred to the recording medium is fixed. For example, a heat-pressure member is preferable. Examples of the heat-pressure member include, but are not limited to, a combination of a heat roller and a pressure roller; and a combination of a heat roller, a pressure roller, and an endless belt.

The fixing process can be preferably performed by the fixing unit.

Heating at the heat-pressure member is preferably performed at 80° C. or more to 200° C. or less.

The image forming apparatus according to the present embodiment may include, e.g., the fixing unit with or instead of a known optical fixing device corresponding to a purpose.

In the fixing process, the surface pressure is not particularly limited and can be suitably selected according to a purpose, but is preferably from 10 $N/cm^2$ or more to 80 $N/cm^2$ or less.

<<Cleaning Process and Cleaning Unit>>

The cleaning process is not particularly limited and can be suitably selected according to a purpose, as long as the residual toner remaining on the image bearer are removed.

The cleaning unit is not particularly limited and can be suitably selected according to a purpose, as long as the residual toner remaining on the image bearer are removed. Examples thereof include, but are not limited to, a magnetic brush cleaner, an electrostatic brush cleaner, a magnetic roller cleaner, a blade cleaner, a brush cleaner, and a web cleaner.

The cleaning process can be preferably performed by the cleaning unit.

<<Neutralization Process and Neutralization Unit>>

The neutralization process is not particularly limited and can be suitably selected according to a purpose, as long as neutralization is performed by applying a neutralization bias to the image bearer.

The neutralization unit is not particularly limited and can be suitably selected according to a purpose, as long as neutralization is performed by applying a neutralization bias to the image bearer. Example thereof include, but are not limited to, a neutralization lamp.

The neutralization process can be preferably performed by the neutralization unit.

<<Recycling Unit and Recycling Process>>

The recycling process is not particularly limited and can be suitably selected according to a purpose, as long as the toner removed in the cleaning process is recycled to the developing device.

The recycling unit is not particularly limited and can be suitably selected according to a purpose, as long as the toner removed in the cleaning process is recycled to the developing device. Examples thereof include, but are not limited to, a known conveying unit.

The Recycling process can be preferably performed by the recycling unit.

<<Control Unit>>

The control unit is a unit to control a drive of each of the aforementioned units. The control unit is not particularly limited and can be suitably selected according to a purpose, as long as the control unit controls a drive of each of the aforementioned units. Examples thereof include controlling instruments such as sequencers and computers.

(Developer)

The developer according to the present embodiment is characterized by being used for the image forming method described above. More specifically, the developer according to the present embodiment contains a carrier and toner, the carrier having a core material particle and a covering layer covering the core material particle and containing an antimony-containing particle, and may further contain, as appropriate, another component.

<Toner>

The toner is not particularly limited, can be suitably selected according to a purpose, and may contain, e.g., a binder resin, a colorant, a charge controlling agent, a release agent, and an external additive, and further contain, as appropriate, a fluidity improving agent, a cleanability improving agent, and a magnetic material.

As the toner, both negative charging toner and positive charging toner can be used.

<<Binder Resin>>

The binder resin is not particularly limited and can be suitably selected according to a purpose. Examples thereof include, but are not limited to, polyester resins, homopolymers of styrene and substitution products thereof, and styrene-based copolymers.

Each of these binder resins can be used alone or in combination with others.

A monomer forming the polyester resin is not particularly limited and can be suitably selected according to a purpose. Examples thereof include, but are not limited to, divalent alcohols, trivalent or higher alcohols, and trivalent or higher carboxylic acids.

Examples of the divalent alcohols include, but are not limited to, ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, and a diol obtained by polymerization between bisphenol A and a cyclic ether such as ethylene oxide or propylene oxide.

Examples of the trivalent or higher alcohols include, but are not limited to, sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxybenzene.

Examples of the trivalent or higher carboxylic acids include, but are not limited to, trimellitic acid, pyromellitic acid, 1,2,4-benzenetricarboxylic acid, 1,2,5-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, tetra(methylenecarboxy)methane, 1,2,7,8-octanetetracarboxylic acid, ENPOL trimer acid, and anhydrides and partial lower alkyl esters thereof.

Combination use of a trivalent or higher alcohol or a trivalent or higher acid provides a polyester resin with a cross-linked structure. The usage of such a polyol or an acid should be controlled so as not to prevent dissolution of the resulting resin in an organic solvent.

When the binder resin is an amorphous polyester resin, examples of an acid component forming the amorphous polyester resin include, but are not limited to, benzene dicarboxylic acids, such as phthalic acid, isophthalic acid, and terephthalic acid, and anhydrides thereof, alkyl dicarboxylic acids, such as succinic acid, adipic acid, sebacic acid, and azelaic acid, and anhydrides thereof; unsaturated dibasic acids, such as maleic acid, citraconic acid, itaconic acid, alkenyl succinic acid, fumaric acid, and mesaconic acid; and unsaturated dibasic acid anhydrides, such as maleic acid anhydride, citraconic acid anhydride, itaconic acid anhydride, and alkenyl succinic acid anhydride.

When the binder resin is an amorphous polyester resin, a molecular weight distribution of THF-soluble matter in resin components preferably has at least one peak within a molecular weight range of 3,000 to 50,000 in view of fixability and offset resistance of toner. In addition, the THF-soluble matter is preferably a binder resin where one or more components having a molecular weight of 100,000 or less account for 60% to 100%. More preferably, the THF-soluble matter is a binder resin having at least one peak within a molecular weight range of 5,000 to 20,000.

The molecular weight distribution of the binder resin can be measured by gel permeation chromatography (GPC) using THF as a solvent.

When the binder resin is an amorphous polyester resin, the acid value thereof is preferably 0.1 mg KOH/g to 100 mg KOH/g, more preferably 0.1 mg KOH/g to 70 mg KOH/g, and particularly preferably 0.1 mg KOH/g to 50 mg KOH/g.

Examples of the homopolymers of styrene or substitution products thereof include, but are not limited to, polystyrene, poly(p-styrene), and polyvinyl toluene.

Examples of the styrene-based copolymer include, but are not limited to, styrene-p-chlorostyrene copolymer, styrene-propylene copolymer, styrene-vinyltoluene copolymer, styrene-methyl acrylate copolymer, styrene-ethyl acrylate copolymer, styrene-methacrylic acid copolymer, styrene-methyl methacrylate copolymer, styrene-ethyl methacrylate copolymer, styrene-butyl methacrylate copolymer, styrene-$\alpha$-methyl chloromethacrylate copolymer, styrene-acrylonitrile copolymer, styrene-vinyl methyl ether copolymer, styrene-vinyl methyl ketone copolymer, styrene-butadiene copolymer, styrene-isoprene copolymer, and styrene-maleate copolymer.

Other examples of the binder resin include, but are not limited to, polymethyl methacrylate, polybutyl methacrylate, polyvinyl chloride, polyvinyl acetate, polyethylene, polyester, polyurethane, epoxy resins, polyvinyl butyral, polyacrylic acid, rosin, modified rosin, terpene resins, phenol resins, aliphatic hydrocarbon resins, aliphatic aromatic hydrocarbon resins, and aromatic petroleum resins, and can also be used.

When the image forming method and the image formation process include a fixing process and a fixing unit to apply pressure to perform fixing, examples of the binder resin include, but are not limited to, polyolefins such as low-molecular-weight polyethylene and low-molecular-weight polypropylene; olefin copolymers such as ethylene-acrylic acid copolymer, ethylene-acrylate copolymer, styrene-methacrylic acid copolymer, ethylene-methacrylate copolymer, ethylene-vinyl chloride copolymer, ethylene-vinyl acetate copolymer and ionomer resins; epoxy resins, polyester, styrene-butadiene copolymer, polyvinyl pyrrolidone, methyl vinyl ether-maleic acid anhydride copolymer, maleic-acid-modified phenol resins, and phenol-modified terpene resins.

<<Colorant>>

The colorant is not particularly limited and can be suitably selected according to a purpose, and any of pigments or dyes can be used.

The toner according to the present embodiment may be color toner or monochrome toner. Generally, color toner, particularly yellow toner is known to be likely to generate color smear due to shaving of a covering layer on a carrier surface. As described in detail later, the developer according to the present embodiment can provide prevention of color smear even when the developer contains color toner.

Examples of the colorant include, but are not limited to, yellow pigments, orange pigments, red pigments, purple pigments, blue pigments, green pigments, black pigments, and white pigments.

Each of these colorants can be used alone or in combination with others.

Examples of the yellow pigments include, but are not limited to, Cadmium Yellow, Mineral Fast Yellow, Nickel Titanium Yellow, Naples Yellow, Naphthol Yellow S, Hansa Yellow G, Hansa Yellow 10G, Benzidine Yellow GR, Quinoline Yellow Lake, Permanent Yellow NCG, and Tartrazine Lake.

Examples of the orange pigments include, but are not limited to, Molybdenum Orange, Permanent Orange GTR, Pyrazolone Orange, Vulcan Orange, Indanthrene Brilliant Orange RK, Benzidine Orange G, and Indanthrene Brilliant Orange GK.

Examples of the red pigments include, but are not limited to, red iron oxide, Cadmium Red, Permanent Red 4R, Lithol Red, Pyrazolone Red, Watching Red calcium salt, Lake Red D, Brilliant Carmine 6B, Eosin Lake, Rhodamine Lake B, Alizarin Lake, and Brilliant Carmine 3B.

Examples of the violet pigments include, but are not limited to, Fast Violet B and Methyl Violet Lake.

Examples of the blue pigments include, but are not limited to, Cobalt Blue, Alkali Blue, Victoria Blue Lake, Phthalocyanine Blue, metal-free Phthalocyanine Blue, partially-chlorinated Phthalocyanine Blue, Fast Sky Blue, and Indanthrene Blue BC.

Examples of the green pigments include, but are not limited to, Chromium Green, chromium oxide, Pigment Green B, and Malachite Green Lake.

Examples of the black pigments include, but are not limited to, carbon black, oil furnace black, channel black, lamp black, acetylene black, azine dyes such as aniline black, metal salt azo dyes, metal oxides, and composite metal oxides.

Examples of the white pigments include, but are not limited to, titanium oxide.

When the toner is transparent toner, the colorant may not be contained.

The colorant may be used as a masterbatch that forms a composite with a masterbatch resin. The masterbatch resin is not particularly limited and can be suitably selected from known ones according to a purpose. Examples thereof include, but are not limited to, polymers of styrene or substitutions thereof, styrene-based copolymers, polymethyl methacrylate resins, polybutyl methacrylate resins, polyvinyl chloride resins, polyvinyl acetate resins, polyethylene resins, polypropylene resins, polyester resins, epoxy resins, epoxy polyol resins, polyurethane resins, polyamide resins, polyvinyl butyral resins, polyacrylic acid resins, rosin, modified rosin, terpene resins, aliphatic hydrocarbon resins, alicyclic hydrocarbon resins, aromatic petroleum resins, chlorinated paraffin, and paraffin.

Each of these may be used alone or in combination with others.

<<Charge Controlling Agent>>

The charge controlling agent is not particularly limited and can be suitably selected according to a purpose. Examples thereof include, but are not limited to, nigrosine, azine-based dyes having an alkyl group with 2 to 16 carbon atoms, basic dyes, lake pigments of the basic dyes, quaternary ammonium salts, dialkyl tin compounds, dialkyl tin borate compounds, guanidine derivatives, polyamine resins, salicylic acid, metal complexes, sulfonated copper phthalocyanine pigments, organic boron salts, fluorine-containing quaternary ammonium salts, and calixarene-based compounds.

Each of these charge controlling agents can be used alone or in combination with others.

Examples of the basic dyes include, but are not limited to, C.I. Basic Yellow 2 (C.I. 41000), C.I. Basic Yellow 3, C.I. Basic Red 1 (C.I. 45160), C.I. Basic Red 9 (C.I. 42500), C.I. Basic Violet 1 (C.I. 42535), C.I. Basic Violet 3 (C.I. 42555), C.I. Basic Violet 10 (C.I. 45170), C.I. Basic Violet 14 (C.I. 42510), C.I. Basic Blue 1 (C.I. 42025), C.I. Basic Blue 3 (C.I. 51005), C.I. Basic Blue 5 (C.I. 42140), C.I. Basic Blue 7 (C.I. 42595), C.I. Basic Blue 9 (C.I. 52015), C.I. Basic Blue 24 (C.I. 52030), C.I. Basic Blue 25 (C.I. 52025), C.I. Basic Blue 26 (C.I. 44045), C.I. Basic Green 1 (C.I. 42040), and C.I. Basic Green 4 (C.I. 42000).

Examples of the quaternary ammonium salts include, but are not limited to, C.I. Solvent Black 8 (C.I.26150), benzoylmethylhexadecyl ammonium chloride, and decyltrimethyl chloride.

Examples of the dialkyl tin compounds include, but are not limited to, dibutyl and dioctyl.

Examples of the polyamine resins include, but are not limited to, vinyl-based polymers having an amino group and condensate-based polymers having an amino group.

Examples of the metal complex include, but are not limited to, metal complexes of dialkylsalicylic acid, naphthoic acid and/or dicarboxylic acid with Zn, Al, Co, Cr and/or Fe.

When the toner is color toner other than black toner, the charge controlling agent is preferably a white-colored metal salt of a salicylic acid derivative.

<<Release Agent>>

When the toner according to the present embodiment is applied to an oil system without application of an anti-toner adhesion oil onto a fixing roller in the image forming apparatus, the toner may contain a release agent.

Generally, toner containing a release agent is known to be likely to generate filming.

In the present embodiment, a fresh developer is supplied along with consumption of toner, thus allowing maintenance of long-term good image quality even when the developer contains toner containing a release agent.

The release agent is not particularly limited and can be suitably selected according to a purpose. Examples thereof include, but are not limited to, polyolefins such as polyethylene and polypropylene, fatty acid metal salts, fatty acid esters, paraffin waxes, amide waxes, polyol waxes, silicone varnishes, carnauba waxes, and ester waxes.

Each of these release agents can be used alone or in combination with others.

The melting point of the release agent is not particularly limited and can be suitably selected according to a purpose, but is preferably 60° C. to 80° C. When the release agent has a melting point of 60° C. or higher, it is possible to effectively prevent a problem in that a release agent easily melts at low temperature, leading to poor heat-resistant preservability. When the release agent has a melting point of 80° C. or less, it is possible to effectively prevent a problem in that a release agent insufficiently melts and generates fixing offset, leading to defective image, even when a resin melts and has a temperature within a fixation temperature range.

The content of the release agent is not particularly limited and can be suitably selected according to a purpose, but is preferably 2 parts by mass or more to 10 parts by mass or less, and more preferably 3 parts by mass or more to 8 parts by mass or less relative to 100 parts by mass of the toner. It is preferred that the content of the release agent be 2 parts by mass or more, because the toner thus exhibits good high-temperature offset resistance and low-temperature fixability during fixation. When the content of the release agent is 10 parts by mass or less, it is possible to effectively prevent a problem in that heat-resistant preservability is reduced, leading to image fog and the like. It is preferred that the content of the release agent be within a more preferred range, 3 parts by mass or more to 8 parts by mass or less, because image quality and fixation stability are more improved.

<<External Additive>>

The external additive is not particularly limited and can be suitably selected according to a purpose. Examples thereof include, but are not limited to, inorganic particles and resin particles.

Each of these external additives can be used alone or in combination with others.

Examples of the inorganic particles include, but are not limited to, silica, titanium oxide, alumina, silicon carbide, silicon nitride, and boron nitride.

Examples of the resin particles include, but are not limited to, methyl methacrylate particles and polystyrene particles having an average particle diameter of 0.05 to 1 μm and produced by soap-free emulsion polymerization.

In particular, preferred are silica having a hydrophobized surface (hereinafter sometimes referred to as "hydrophobized silica), titanium oxide having a hydrophobized surface (hereinafter sometimes referred to as "hydrophobized titanium oxide"), and more preferred is combination use of hydrophobized silica and hydrophobized titanium oxide. In combination use of hydrophobized silica and hydrophobized titanium oxide, it is preferred that hydrophobized titanium oxide be added in a larger amount than hydrophobized silica, because toner is thus produced with good charging stability to humidity.

Hydrophobization can be performed by treating hydrophilic particles with a silane coupling agent such as methyl trimethoxysilane, methyl triethoxysilane, or octyl trimethoxysilane.

Also preferred are silicone oil-treated oxide particles and silicone oil-treated inorganic particles produced by treating oxide particles, inorganic particles, etc. with silicone oil. In use of the silicone oil, heat can be applied as appropriate.

The silicone oil is not particularly limited and can be suitably selected according to a purpose. Examples thereof include, but are not limited to, dimethyl silicone oil, methyl phenyl silicone oil, chlorophenyl silicone oil, methyl hydrogen silicone oil, alkyl-modified silicone oil, fluorine-modified silicone oil, polyether-modified silicone oil, alcohol-modified silicone oil, amino-modified silicone oil, epoxy-modified silicone oil, epoxy-polyether-modified silicone oil, phenol-modified silicone oil, carboxyl-modified silicone oil, mercapto-modified silicone oil, methacryl-modified silicone oil, and α-methylstyrene-modified silicone oil.

<<Fluidity Improving Agent>>

The fluidity improving agent is not particularly limited and can be suitably selected according to a purpose, as long as the fluidity improving agent provides increased hydrophobicity through surface treatment and allows prevention of deterioration of rheological characteristics, charging characteristics, and the like even under high humidity. Examples thereof include silane coupling agents, silylation agents, silane coupling agents having an alkyl fluoride group, organic titanate-based coupling agents, and aluminum-based coupling agents, silicone oil, and modified silicone oil.

Preferably, the silica and the titanium oxide as described above are surface-treated with such a fluidity improving agent and used as hydrophobic silica and hydrophobic titanium oxide.

<<Cleanability Improving Agent>>

The cleanability improving agent is not particularly limited and can be suitably selected according to a purpose, as long as the cleanability improving agent is added for removing a developer remaining on a photoconductor, a primary-transfer medium, etc. after transfer. Examples thereof include, but are not limited to, metal salts of fatty acids such as zinc stearate, calcium stearate, and stearic acid; and polymer particles produced by soap-free emulsion polymerization such as polymethyl methacrylate particles and polystyrene particles.

The polymer particles preferably has a relatively narrow particle size distribution, and further preferably has a volume average particle diameter of 0.01 μm to 1 μm.

<<Magnetic Material>>

The magnetic material is not particularly limited and can be suitably selected according to a purpose. Examples thereof include, but are not limited to, iron powder, magnetite, and ferrite. In particular, those having white color tone are preferred.

A method of producing the toner according to the present embodiment is not particularly limited and can be suitably selected according to a purpose. Examples thereof include, but are not limited to, known methods such as pulverization and polymerization.

[Method of Producing Toner (Pulverization)]

Production of toner with pulverization can be performed, e.g., as follows.

The aforementioned toner materials are put into a melt-kneader and kneaded, and the melt-kneaded material thus obtained is cooled and then subjected to a pulverization process and a classification process, thereby preparing matrix particles. Subsequently, to improve transferability and durability, an external addition process is performed to add an external additive onto the matrix particles, thereby preparing toner.

Examples of the melt-kneader include, but are not limited to, batch two-rolls, Banbury mixers, continuous twin-screw extruders, and continuous single-screw kneaders.

Specific examples of the continuous twin-screw extruder include, but are not limited to a KTK-type twin-screw extruder (manufactured by Kobe Steel, Ltd.), a TEM-type twin-screw extruder (manufactured by Toshiba Machine Co., Ltd. (present Shibaura Machine Co., Ltd.)), a twin-screw extruder (KCK; manufactured by Asada Iron Works Co., Ltd.), a PCM-type twin-screw extruder (manufactured by Ikegai Corporation), and a KEX-type twin-screw extruder (manufactured by Kurimoto, Ltd.)

Specific examples of the continuous single-screw kneader include, but are not limited to, a co-kneader (manufactured by BUSS AG).

In the pulverization process, the melt-kneaded material is pulverized. In the pulverization process, the melt-kneaded material is preferably, coarsely pulverized by a hammer mill, a ROTOPLEX, or the like and then finely pulverized by a fine pulverizer with jet stream, a mechanical fine pulverizer, or the like.

The pulverization process preferably employs pulverization by crashing the melt-kneaded material into a collision plate in jet stream, pulverization by crushing particles of the melt-kneaded material into each other in jet stream, and pulverization by using a narrow gap between a mechanically rotating rotor and a stator.

In the pulverization process, pulverization is preferably performed so as to provide particles thus obtained with an average particle diameter of 3 μm to 15 μm.

In the classification process, the pulverized material obtained by the pulverization is classified to be adjusted to have a predetermined particle diameter.

The classification process can be performed by removing a particle fraction with a wind classifier such as a cyclone separator, a decanter, or a centrifuge.

In the classification process, classification is preferably performed so as to provide matrix particles with an average particle diameter of 5 μm to 20 μm.

In the external addition process, mixing and stirring with use of a mixer cause an external additive to be crushed and loosen and to simultaneously adhere onto a surface of a matrix particle. The mixer is not particularly limited, but preferably includes a jacket or the like to adjust interior temperature of the mixer.

In the external addition process, in order to change a load applied to the additive, the additive can be added during the external addition process or gradually. At that time, the rotation frequency, rotation rate, time, temperature, etc. of the mixer may be changed.

Examples of the mixer include, but are not limited to, a V-type mixer, a Rocking mixer, a Loedige mixer, a Nauta mixer, and a Henschel mixer. Subsequently, the mixed product is passed through a sieve for the purpose of removing bulky particles and aggregated particles, thereby providing toner.

[Method of Producing Toner (Polymerization Method)]

In production of toner with polymerization, examples of a method of producing toner include, but are not limited to, dissolution suspension. As an example thereof, the following description will be made for a method of forming toner matrix particles along with producing a polyester resin by an elongation reaction and/or a cross-linking reaction of a prepolymer and a curing agent. This method performs preparation of an aqueous medium, preparation of an oil phase containing toner materials, emulsification or dispersion of the toner materials, and removal of an organic solvent.

——Preparation of Aqueous Medium (Aqueous Phase)——

Preparation of the aqueous medium can be performed by dispersing the binder resin in an aqueous material. The amount of the binder resin added to the aqueous medium is not particularly limited and can be suitably selected according to a purpose, but is preferably 0.5 parts by mass or more to 10 parts by mass or less relative to 100 parts by mass of the aqueous medium.

The aqueous medium is not particularly limited and can be suitably selected according to a purpose. Examples thereof include, but are not limited to, water, water-miscible solvents, and mixtures thereof. In particular, water is preferred.

The water-miscible solvents are not particularly limited and can be suitably selected according to a purpose. Examples thereof include, but are not limited to, alcohols, dimethylformamide, tetrahydrofuran, cellosolves, and lower ketones.

Examples of the alcohols include, but are not limited to, methanol, isopropanol, and ethylene glycol.

Examples of the lower ketones include, but are not limited to, acetone and methyl ethyl ketone.

——Preparation of Oil Phase——

Preparation of the oil phase can be performed by dissolving or dispersing, in an organic solvent, the aforementioned toner materials containing the binder resin, a prepolymer, a curing agent, the release agent, the colorant, etc.

The organic solvent is not particularly limited and can be suitably selected according to a purpose, but an organic solvent having a boiling point of lower than 150° C. is preferred for easy removal.

Examples of the organic solvent having a boiling point of lower than 150° C. include, but are not limited to, toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone.

In particular, preferred are ethyl acetate, toluene, xylene, benzene, methylene chloride, 1,2-dichloroethane, chloroform, and carbon tetrachloride, and more preferred is ethyl acetate.

Each of these can be used alone or in combination with others.

————Prepolymer————

The prepolymer is a polymer that can react with an active hydrogen group-containing compound. Specific examples of the prepolymer include, but are not limited to, an isocyanate group-containing polyester resin.

The isocyanate group-containing polyester resin is not particularly limited and can be suitably selected according to a purpose. Examples thereof include, but are not limited to, a reaction product of a polyester resin having an active hydrogen group with a polyisocyanate. The reaction product can be used for a reaction with the curing agent described later.

The polyester resin having an active hydrogen group may be obtained by, e.g., polycondensation of a diol, a dicarboxylic acid, and at least one of a trivalent or higher alcohol and a trivalent or higher carboxylic acid.

Examples of the diol include, but are not limited to, aliphatic diols such as ethylene glycol, 1,2-propylene glycol, 1,3-propylene glycol, 1,4-butanediol, 3-methyl-1,5-pentanediol, 1,6-hexanediol, 1,8-octanediol, 1,10-decanediol, and 1,12-dodecanediol; oxyalkylene-group-containing diols such as diethylene glycol, triethylene glycol, dipropylene glycol, polyethylene glycol, polypropylene glycol, and polytetramethylene glycol; alicyclic diols such as 1,4-cyclohexanedimethanol and hydrogenated bisphenol A; alkylene oxide (e.g., ethylene oxide, propylene oxide, and butylene oxide) adducts of alicyclic diols; bisphenols such as bisphenol A, bisphenol F, and bisphenol S; and alkylene oxide (e.g., ethylene oxide, propylene oxide, and butylene oxide) adducts of bisphenols. In particular, aliphatic diols having 4 or more to 12 or less carbon atoms are preferred.

Each of these diols can be used alone or in combination with others.

Examples of the dicarboxylic acid include, but are not limited to, aliphatic dicarboxylic acids and aromatic dicarboxylic acids. In addition, anhydrides, lower alkyl (C1-C3) esters, and halides thereof may also be used.

Examples of the aliphatic dicarboxylic acids include, but are not limited to, succinic acid, adipic acid, sebacic acid, dodecanedioic acid, maleic acid, and fumaric acid. In particular, aliphatic dicarboxylic acids having 4 to 12 carbon atoms are preferred.

The aromatic dicarboxylic acids are not particularly limited and can be suitably selected according to a purpose, but are preferably aromatic dicarboxylic acids having 8 to 20 carbon atoms. Examples of the aromatic dicarboxylic acids having 8 to 20 carbon atoms include, but are not limited to, phthalic acid, isophthalic acid, terephthalic acid, and naphthalenedicarboxylic acid.

Each of these dicarboxylic acids can be used alone or in combination with others.

The trivalent or higher alcohol is not particularly limited and can be suitably selected according to a purpose. Examples thereof include, but are not limited to, trivalent or higher aliphatic alcohols, trivalent or higher polyphenols, and alkylene oxide adducts of trivalent or higher polyphenols.

Examples of the trivalent or higher aliphatic alcohols include, but are not limited to, glycerin, trimethylolethane, trimethylolpropane, pentaerythritol, and sorbitol.

Examples of the trivalent or higher polyphenols include, but are not limited to, trisphenol PA, phenol novolac, and cresol novolac.

Examples of the alkylene oxide adducts of trivalent or higher polyphenols include, but are not limited to, alkylene oxide (e.g., ethylene oxide, propylene oxide, and butylene oxide) adducts of trivalent or higher polyphenols.

The trivalent or higher carboxylic acid is not particularly limited and can be suitably selected according to a purpose. Examples thereof include, but are not limited to, trivalent or higher aromatic carboxylic acids. In addition, anhydrides, lower alkyl (C1-C3) esters, and halides thereof may also be used.

Preferred examples of the trivalent or higher aromatic carboxylic acids include trivalent or higher aromatic carboxylic acids having 9 to 20 carbon atoms. Examples of the trivalent or higher aromatic carboxylic acids having 9 to 20 carbon atoms include, but are not limited to, trimellitic acid and pyromellitic acid.

The polyisocyanate is not particularly limited and can be suitably selected according to a purpose. Examples thereof include, but are not limited to, diisocyanates and trivalent or higher isocyanates.

The polyisocyanate is not particularly limited and can be suitably selected according to a purpose. Examples thereof include, but are not limited to, aliphatic diisocyanates, alicyclic diisocyanates, aromatic diisocyanates, araliphatic diisocyanates, isocyanurates, and any of these isocyanates protected with a phenol derivative, oxime, or caprolactam.

Examples of the aliphatic diisocyanate include, but are not limited to, tetramethylene diisocyanate, hexamethylene diisocyanate, methyl 2,6-diisocyanatocaproate, octamethylene diisocyanate, decamethylene diisocyanate, dodecamethylene diisocyanate, tetradecamethylene diisocyanate, trimethylhexane diisocyanate, and tetramethylhexane diisocyanate.

Examples of the alicyclic diisocyanates include, but are not limited to, isophorone diisocyanate and cyclohexylmethane diisocyanate.

Examples of the aromatic diisocyanates include, but are not limited to, tolylene diisocyanate, diisocyanatodiphenylmethane, 1,5-naphthylene diisocyanate, 4,4'-diisocyanatodiphenyl, 4,4'-diisocyanato-3,3'-dimethyldiphenyl, 4,4'-diisocyanato-3-methyldiphenylmethane, and 4,4'-diisocyanatodiphenyl ether.

Examples of the aromatic aliphatic diisocyanates include, but are not limited to, α,α,α',α'-tetramethylxylylene diisocyanate.

Examples of the isocyanurates include, but are not limited to, tris(isocyanatoalkyl) isocyanurate and tris(isocyanatocycloalkyl) isocyanurate.

Each of these polyisocyanates can be used alone or in combination with others.

———Curing Agent———

The curing agent is not particularly limited and can be suitably selected according to a purpose, as long as the curing agent reacts with the prepolymer. Examples thereof include, but are not limited to, an active hydrogen group-containing compound.

The active hydrogen group in the active hydrogen group-containing compound is not particularly limited and can be suitably selected according to a purpose. Examples thereof include, but are not limited to, hydroxyl groups (alcoholic hydroxyl groups and phenolic hydroxyl groups), amino groups, carboxyl groups, and mercapto groups.

Each of these can be used alone or in combination with others.

The active hydrogen group-containing compound is not particularly limited and can be suitably selected according to a purpose, but is preferably an amine in view of forming a urea bond.

The amine is not particularly limited and can be suitably selected according to a purpose. Examples thereof include, but are not limited to, diamines, trivalent or higher amines, amino alcohols, amino mercaptans, amino acids, and any of these amines having an amino group protected. In particular, a diamine alone and a mixture of a diamine with a small amount of a trivalent or higher amine are preferred.

Each of these can be used alone or in combination with others.

Examples of the diamines include, but are not limited to, aromatic diamines, alicyclic diamines, and aliphatic diamines.

Examples of the aromatic diamines include, but are not limited to, phenylenediamine, diethyltoluenediamine, and 4,4'-diaminodiphenylmethane.

Examples of the alicyclic diamines include, but are not limited to, 4,4'-diamino-3,3'-dimethyldicyclohexylmethane, diaminocyclohexane, and isophoronediamine.

Examples of the aliphatic diamines include, but are not limited to, ethylenediamine, tetramethylenediamine, and hexamethylenediamine.

Examples of the trivalent or higher amines include, but are not limited to, diethylenetriamine and triethylenetetramine.

Examples of the amino alcohols include, but are not limited to, ethanolamine and hydroxyethylaniline.

Examples of the amino mercaptans include, but are not limited to, aminoethyl mercaptan and aminopropyl mercaptan.

Examples of the amino acids include, but are not limited to, aminopropionic acid and aminocaproic acid.

Examples of the amines having an amino group protected include, but are not limited to, ketimine compounds obtained by protecting the amino group with a ketone such as acetone, methyl ethyl ketone, or methyl isobutyl ketone; and oxazoline compounds.

——Emulsification or Dispersion——

The emulsification or dispersion can be performing by dispersing the oil phase in the aqueous medium.

In emulsification or dispersion of the toner materials, the curing agent and the prepolymer can be subjected to an elongation reaction and/or a cross-linking reaction.

Reaction conditions (reaction time and reaction temperature) for production of the prepolymer are not particularly limited and can be suitably selected corresponding to combination of the curing agent and the prepolymer. Reaction time is preferably 10 minutes to 40 hours, more preferably 2 hours to 24 hours, and reaction temperature is preferably 0° C. to 150° C., and more preferably 40° C. to 98° C.

With regard to the oil phase, a method of dispersing uniformly a component of the oil phase is not particularly limited, and a homomixer, MILDER, or a bead mill can be suitably selected corresponding to formulation of the oil phase or a condition such as viscosity of the oil phase. Dispersion time is preferably 1 hour to 5 hours, and more preferably 1 hour to 3 hours.

In the emulsification or dispersion process, a method of stably dispersing the oil phase in the aqueous medium is not particularly limited and can be suitably selected according to a purpose. Examples thereof include a method of performing dispersion by shearing force.

A disperser for the dispersing is not particularly limited and can be suitably selected according to a purpose. Examples thereof include, but are not limited to, low-speed shear-type dispersers, high-speed shear-type dispersers, friction-type dispersers, high-pressure jet dispersers, and ultrasonic dispersers. In particular, high-speed shear-type dispersers are preferred in view of providing adjustment of the particle diameter of dispersoids (oil droplets) to 2 μm to 20 μm.

When the high-speed shear disperser is used, dispersing conditions, such as rotation frequency, dispersing time, and dispersing temperature, can be suitably selected according to a purpose. The rotation frequency is preferably 1,000 rpm to 30,000 rpm, and preferably 5,000 rpm to 20,000 rpm. The dispersing time is preferably from 0.1 minutes to 5 minutes in use of a batch-type disperser. The dispersing temperature is preferably 0° C. to 150° C., and more preferably 40° C. to 98° C., under pressure. Generally, as the dispersing temperature becomes higher, the dispersing becomes easier.

The usage of the aqueous medium in emulsification or dispersion of toner materials in the oil phase is not particularly limited and can be suitably selected according to a purpose, but is preferably 50 parts by mass or more to 2,000 parts by mass or less, and more preferably 100 parts by mass or more to 1,000 parts by mass or less relative to 100 parts by mass of the toner materials.

When the usage of the aqueous medium is 50 parts by mass or more, it is possible to solve a problem in that the toner materials are poorly dispersed, thus failing to provide toner matrix particles with a predetermined particle diameter.

It is preferred that the usage of the aqueous medium be 2,000 parts by mass or less, because production cost is thus reduced.

In emulsification or dispersion of the oil phase containing the toner materials, a dispersant is preferably used in view of stabilizing dispersoids such as oil droplets and providing toner particles with a desired shape and a narrow particle size distribution.

The dispersant is not particularly limited and can be suitably selected according to a purpose. Examples thereof include, but are not limited to, surfactants, poorly-water-soluble inorganic compound dispersants, and polymeric protective colloids. In particular, surfactants are preferred. Each of these can be used alone or in combination with others.

The surfactants are not particularly limited and can be suitably selected according to a purpose. For example, anionic surfactants, cationic surfactants, nonionic surfactants, and ampholytic surfactants can be used. Examples of the anionic surfactants include, but are not limited to, alkylbenzene sulfonic acid salts, α-olefin sulfonic acid salts, and phosphoric acid esters. In particular, those having a fluoroalkyl group are preferred.

——Removal of Organic Solvent——

A method of removing an organic solvent from a dispersion liquid, such as an emulsion slurry, derived by the emulsification or dispersion process is not particularly limited and can be suitably selected according to a purpose. Examples thereof include, but are not limited to, a method of gradually raising the temperature of a reaction system to evaporate an organic solvent from oil droplets, or a method of spraying the dispersion liquid into dry atmosphere to evaporate an organic solvent from oil droplets.

Upon removal of the organic solvent, toner matrix particles are formed. The toner matrix particles can be subjected to washing, drying, etc., and optionally, classification and another process.

The classification may be performed in a liquid by removing a particle fraction by a cyclone separator, a decanter, a centrifuge, or the like. Alternatively, a classification operation may be performed after drying.

The toner matrix particles may be mixed with particles of the external additive, the charge controlling agent, and the like. In the mixing, application of mechanical impulsive force allows suppressing release of particles of the external additive, etc. from a surface of the toner matrix particles.

The method of applying mechanical impulsive force is not particularly limited and can be suitably selected according to a purpose. Examples thereof include, but are not limited to, a method of applying mechanical impulsive force with use of blades rotating at a high speed, a method of putting and accelerating a mixture in a high-speed air current and crushing particles with each other or a collision plate.

A device used in the method of applying mechanical impulsive force is not particularly limited and can be suitably selected according to a purpose. Examples thereof include, but are not limited to, ONG MILL (manufactured by Hosokawa Micron Corporation), a device derived by modifying I-TYPE MILL (manufactured by Nippon Pneumatic Mfg. Co., Ltd.) to reduce pulverizing air pressure, HYBRIDIZATION SYSTEM (manufactured by Nara Machinery Co., Ltd.), KRYPTON SYSTEM (manufactured by Kawasaki Heavy Industries, Ltd.), and an automatic mortar.

<Carrier>

The carrier has a core material particle and a covering layer covering the core material particle and containing an antimony-containing particle, and may contain, as appropriate, a resistance adjuster and another component.

<<Core Material Particle>>

The core material particle is not particularly limited and can be suitably selected among those known as carriers in a two-component developer according to a purpose. In view of being relatively highly-magnetized and allowing setting of magnetic moment per carrier particle within an appropriate range, Mn ferrite is preferred.

<<Covering Layer>>

The covering layer is a layer covering the core material particle, contains at least antimony-containing particles, and may contain, as appropriate, an inorganic particle for a covering layer, a covering layer resin, and another component.

The antimony-containing particles have semiconductivity and can appropriately adjust resistance of a carrier particle, as described above, thus preventing excessive reduction in resistance of a carrier particle and preventing occurrence of failure such as scattering of toner and image fog.

Furthermore, in a conventional carrier containing a resistance adjuster, a resin covering layer coating a carrier core material particle peels to cause a resistance adjuster, a base particle, etc. to be exposed on a surface of the carrier particle, thereby changing resistance of a carrier, as described above. By contrast, in the present embodiment, inclusion of antimony-containing particles in a covering layer prevents significant reduction in resistance and thus enables prevention of carrier deposition, even when a covering resin layer is shaved to cause an antimony-containing particle, a core material particle, etc. to be exposed.

<<<Antimony-Containing Particles>>>

The antimony-containing particles are not particularly limited and can be suitably selected according to a purpose, but are preferably particles doped with antimony (hereinafter, also sometimes referred to as "antimony-doped particles").

A particle in the antimony-doped particles, i.e., the subject to be doped with antimony, is not particularly limited and can be suitably selected according to a purpose, but is preferably metal oxide in view of having good conductivity.

Examples of metal forming the metal oxide include, but are not limited to, tin, manganese, aluminum, titanium, zinc, gallium, niobium, and tantalum. In particular, tin is preferred in view of having good conductivity.

The amount of antimony doped in the antimony-doped particles is not particularly limited and can be suitably selected according to a purpose, but is preferably 0.01 mass % or more to 5 mass % or less in view of having good conductivity.

The antimony-containing particles preferably have a structure containing tin oxide doped with antimony (hereinafter sometimes referred to as "antimony-doped tin oxide") on surfaces of base particles. Such a structure can prevent reduction in resistance adjustability due to the antimony-doped tin oxide collapsing in the covering layer and releasing as fragments.

The base particles are not particularly limited and can be suitably selected according to a purpose, but are preferably inorganic particles, and more preferably aluminum oxide, in view of improving resistance adjustability and preventing failure such as image fog and scattering of toner. A reason of preferential use of aluminum oxide as the base particles can be attributed to good compatibility with a conductive treatment of base particle surfaces, causing an effect of the treatment to work efficiently.

With use of a large amount of the inorganic particles, the proportion of a non-magnetic material is increased with an increase in mass per carrier particle, thus sometimes facilitating carrier deposition. However, a developer according to the present embodiment is preferred because antimony-doped tin oxide provide high conductivity even for a small amount of inorganic particles, thus reducing risk of occurrence of carrier deposition.

The antimony-containing particles preferably contains diantimony pentaoxide in view of providing a carrier with less harm to human body and efficient resistance adjustability, and in view of improving image uniformity.

The average equivalent circle diameter of the antimony-containing particles is not particularly limited and can be suitably selected according to a purpose. The term "average equivalent circle diameter" as used herein refers to the average value of the diameters of perfect circles corresponding to areas of primary particles on an image.

The average equivalent circle diameter of the antimony-containing particles is preferably 500 nm or more to 1000 nm or less.

It is preferred that the antimony-containing particles have an average equivalent circle diameter of 500 nm or more, because the antimony-containing particles thus have a moderately small particle diameter, thereby allowing efficient reduction in carrier resistance.

It is preferred that the antimony-containing particles have an average equivalent circle diameter of 1000 nm or less, because the antimony-containing particles are thus prevented from releasing from a covering layer.

A method of measuring the average equivalent circle diameter of the antimony-containing particles is not particularly limited and can be suitably selected according to a purpose. Measurement and calculation can be performed by, e.g., the method as follows.

[Measurement Method and Calculation Method of Average Equivalent Circle Diameter]

An average equivalent circle diameter can be obtained by performing observation and photographing using a SEM, acquiring a plurality of SEM images, then randomly selecting 1000 particles from the images, deriving equivalent circle diameters from outer shapes of the selected particles, and calculating an average value.

The content of antimony-containing particles in the carrier is preferably 40 parts by mass or more to 120 parts by mass or less, and more preferably 60 parts by mass or more to 100 parts by mass or less, relative to 100 parts by mass of the covering layer resin described later.

It is preferred that the content of antimony-containing particles in the carrier be 40 parts by mass or more relative to 100 parts by mass of the covering layer resin described later, because a covering layer thus has high conductivity.

It is preferred that the content of antimony-containing particles in the carrier be 120 parts by mass or less relative to 100 parts by mass of a covering layer resin described later, because antimony-containing particles can thus be retained in a covering layer.

<<<Inorganic Particles for Covering Layer>>>

The covering layer preferably contain inorganic particles for a covering layer, in addition to the antimony-containing particles.

The inorganic particles for a covering layer provides a covering layer with durability to slide and abrasion, and allows reduction in deterioration due to friction, shaving, etc.

The durability of a covering layer is also improved by the antimony-containing particle, but the content of the antimony-containing particles in a covering layer affects an electric resistance value in a carrier. Thus, it is preferred that the durability of a covering layer be improved by addition of the inorganic particles for a covering layer.

The inorganic particles for a covering layer are not particularly limited and can be suitably selected according to a purpose, but are preferably white inorganic particles. It is preferred that the inorganic particles for a covering layer be white, because there is thus less influence on toner color even when the inorganic particles for a covering layer release from a covering layer.

A material of the inorganic particles for a covering layer is not particularly limited and can be suitably selected according to a purpose. However, when negatively-charged toner is used as the toner, a material with positive electrostatic charge is preferably used as the inorganic particles for a covering layer in view of stabilizing capability to provide electrostatic charge for a long period.

Specific examples of a material of the inorganic particles for a covering layer include, but are not limited to, metal particles of gold, silver, copper, silica, or aluminum; titanium oxide; tin oxide; zinc oxide; zirconium oxide; indium oxide; antimony oxide; calcium oxide; ITO; silicone oxide; colloidal silica; aluminum oxide; yttrium oxide; cobalt oxide; copper oxide; iron oxide; manganese oxide; niobium oxide; vanadium oxide; selenium oxide; barium sulfate; magnesium oxide; magnesium hydroxide; silicon dioxide; boron nitride; silicon nitride; potassium titanate; hydrotalcite; tin oxide doped with antimony, tungsten, or the like; indium oxide doped with tin; and silicon carbide.

In particular, preferred are barium sulfate, aluminum oxide, magnesium oxide, magnesium hydroxide, and hydrotalcite, and more preferred is barium sulfate in view of being white and having high capability to provide electrostatic charge against negatively charged toner.

Preferably, the inorganic particles for a covering layer consist essentially of barium sulfate. When the inorganic particles for a covering layer consist essentially of barium sulfate, a contact ratio between the barium sulfate on a surface of the covering layer and the toner is thereby increased, allowing exertion of a maximum effect to provide electrostatic charge.

The average equivalent circle diameter of the inorganic particles for a covering layer is not particularly limited and can be suitably selected according to a purpose, but is preferably 400 nm or more to 900 nm or less, and more preferably 600 nm or more to 900 nm or less.

It is preferred that the inorganic particles for a covering layer have an average equivalent circle diameter of 400 nm or more to 900 nm or less, because positioning is thus possible so as to expose some of the inorganic particles for a covering layer on a surface of the covering layer, allowing securing electrostatic charge against toner.

It is preferred that the inorganic particles for a covering layer have an average equivalent circle diameter of 600 nm or more, because charging capability and developing capability are thus stabilized.

It is preferred that the inorganic particles for a covering layer have an average equivalent circle diameter of 900 nm or less, because the inorganic particles for a covering layer thus have a particle diameter not too large relative to the thickness of the covering layer, and can be sufficiently retained in the covering layer resin described later and prevented from releasing from a covering layer.

A method of measuring the average equivalent circle diameter of the inorganic particles for a covering layer is not particularly limited and can be suitably selected according to a purpose. For example, measurement can be performed by the following method.

[Method of Measuring Average Equivalent Circle Diameter]

An average equivalent circle diameter can be obtained by performing observation and photographing using a SEM, acquiring a plurality of SEM images, then randomly selecting 1000 inorganic particles for a covering layer from the images, deriving equivalent circle diameters from outer shapes of the selected particles, and calculating an average value.

The content of inorganic particles for a covering layer in the carrier is preferably 30 parts by mass or more to 100 parts by mass or less, and more preferably 50 parts by mass or more to 80 parts by mass or less, relative to 100 parts by mass of the resin for a covering layer described later.

It is preferred that the content of inorganic particles for a covering layer in the carrier be 30 parts by mass or more relative to 100 parts by mass of a covering layer resin, because electrostatic charge is thus sufficiently provided.

It is preferred that the content of inorganic particles for a covering layer in the carrier be 100 parts by mass or less relative to 100 parts by mass of a covering layer resin, because inorganic particles can thus be retained in a covering layer.

<<<<Covering Layer Resin>>>

The covering layer resin is not particularly limited and can be suitably selected according to a purpose. Examples thereof include, but are not limited to, silicone resins and acrylic resins. In particular, combination use of a silicone resin and an acrylic resin is preferred.

A reason of preferential use of silicone resin and acrylic resin in combination as the covering layer resin is as follows.

Acrylic resins have high adhesiveness and low fragility, and are thus characterized by exceptionally high abrasion resistance. However, since acrylic resins also bear high surface energy, combination use with easily-spent toner may result in failure such as reduction in electrostatic charge due to accumulation of spent toner components. Such a failure can be resolved by combination use with a silicone resin. The silicone resin bears low surface energy and thus makes toner components less likely to be spent, preventing accumulation of a spent component that causes film shaving. Additionally, it is preferred to balance the characteristics between the silicone resin and the acrylic resin because silicone resins have low adhesiveness and high fragility and are thus characterized by low abrasion resistance.

——Silicone Resin——

The silicone resin is not particularly limited and can be suitably selected from known ones. Examples thereof include, but are not limited to, straight silicone fully composed of organosiloxane bond; and silicone resins modified with alkyd, polyester, epoxy, acryl, urethane or the like.

The silicone resin may be used as an elemental silicone resin, or may be used in combination with another component for a cross-linking reaction, an electrostatic charge adjusting component, or the like.

As the silicone resin, an appropriately synthesized substance or a commercially-available product may be used.

Examples of a commercially-available product of the straight silicon resins include, but are not limited to, in trade name, KR271, KR255, and KR152 (these are manufactured by Shin-Etsu Chemical Co., Ltd.); and SR2400, SR2406, and SR2410 (these are manufactured by Toray Dow Corning Silicone Co., Ltd. (present Dow Toray Co., Ltd.)) Examples of a commercially-available product of the modified silicone resins include, but are not limited to, in trade name, KR206 (alkyd-modified), KR5208 (acryl-modified), and ES1001N (epoxy-modified); KR305 (urethane-modified) (these are manufactured by Shin-Etsu Chemical Co., Ltd.); and SR2115 (epoxy-modified) and SR2110 (alkyd-modified) (these are manufactured by Toray Dow Corning Silicone Co., Ltd. (present Dow Toray Co., Ltd.))

——Acrylic Resin——

The acrylic resin is not particularly limited and can be suitably selected from known ones.

The acrylic resin may be used as an elemental acrylic resin, or may be used in combination with another component for a cross-linking reaction, an electrostatic charge adjusting component, or the like.

The other component for a cross-linking reaction is not particularly limited and can be suitably selected according to a purpose. Example thereof include amino resins and acidic catalysts.

The amino resin is not particularly limited and can be suitably selected according to a purpose. Examples thereof include, but are not limited to, guanamine and melamine resins.

The acidic catalyst is not particularly limited and can be suitably selected according to a purpose, as long as the acidic catalyst has catalytic action. Examples thereof include, but are not limited to, those having a reactive group such as a fully-alkylated type, a methylol group type, an imino group type, or a methylol/imino group type.

When the silicone resin, the acrylic resin, or a combination of the silicone resin and the acrylic resin is used as the covering layer resin, silanol groups are preferably condensed by a condensation polymerization catalyst and thereby cross-linked, in view of increasing strength of a covering layer.

The condensation polymerization catalyst is not particularly limited and can be suitably selected according to a purpose. Example thereof include, but are not limited to, titanium-based catalysts, tin-based catalysts, zirconium-based catalysts, and aluminum-based catalysts.

[Average Thickness of Covering Layer]

The average thickness of the covering layer is not particularly limited and can be suitably selected according to a purpose, but is preferably 0.50 μm or more, and more preferably 0.50 μm or more to 1.00 μm or less.

It is preferred that the covering layer have an average thickness of 0.5 μm or more, because the covering layer thus has no missing part and can sufficiently retain the inorganic particles for a covering layer.

A method of measuring the average thickness of the covering layer is not particularly limited, but an example of measurement can be performed by, e.g., the following method.

[Method of Measuring Average Thickness of Covering Layer]

An average thickness can be measured by cutting a carrier by ion milling or the like, observing 50 sites in the cut plane thereof by SEM.

[Volume Average Particle Diameter of Carrier]

The volume average particle diameter of a carrier according to the present embodiment is not particularly limited and can be suitably selected according to a purpose, but is preferably 20 μm or more to 100 μm or less.

It is preferred that the carrier have a volume average particle diameter of 20 μm or more, because carrier deposition can thus be prevented.

It is preferred that the carrier have a volume average particle diameter of 100 μm or less, because reproducibility in detail of an image is thus not reduced, allowing formation of a delicate image.

A method of measuring the volume average particle diameter of the carrier is not particularly limited, but measurement can be performed using, e.g., MICROTRAC particle size distribution meter, model HRA9320-X and SRA series (these are manufactured by Nikkiso Co., Ltd.)

<<Method of Producing Carrier>>

The carrier according to the present embodiment can be produced by, e.g., preparing a coating liquid for forming the covering layer, then applying uniformly the coating liquid onto a surface of the core material particle by a known application method, followed by drying and then baking.

The application method is not particularly limited and can be suitably selected according to a purpose. Examples thereof include, but are not limited to, dipping, spraying, and brush painting.

A method of the baking is not particularly limited and can be suitably selected according to a purpose, and may be, e.g., external heating or internal heating. A device for the baking is not particularly limited and can be suitably selected according to a purpose. Examples thereof include, but are not limited to, stationary electric furnaces, fluidized-bed electric furnaces, rotary electric furnaces, burner furnaces, and devices equipped with microwaves.

<<<Coating Liquid>>>

The coating liquid contains a solvent, antimony-containing particles, and a covering layer resin, and may contain, as appropriate, inorganic particles for a covering layer, a silane coupling agent, a dispersant, an antifoamer, a resistance adjuster, etc.

The antimony-containing particles, the covering layer resin, and the inorganic particles for a covering layer are the same as described in the section of "Covering Layer" described above, and details are omitted.

——Solvent——

The solvent is not particularly limited and can be suitably selected according to a purpose. Examples thereof include, but are not limited to, toluene, xylene, methyl ethyl ketone, methyl isobutyl ketone, cellosolve, butyl acetate, and synthesized isoparaffinic hydrocarbon.

——Silane Coupling Agent——

The coating liquid may contain a silane coupling agent in order to stably disperse inorganic particles for a covering layer, in the coating liquid and the covering layer.

The silane coupling agent is not particularly limited and can be suitably selected according to a purpose. Examples thereof include, but are not limited to, 7-(2-aminoethyl)aminopropyltrimethoxysilane, 7-(2-aminoethyl)aminopropylmethyldimethoxysilane, γ-methacryloxypropyltrimethoxysilane, N-β-(N-vinylbenzylaminoethyl)-γ-aminopropyltrimethoxysilane hydrochloride, γ-glycidoxypropyltrimethoxysilane, γ-mercaptopropyltrimethoxysilane, methyltrimethoxysilane, methyltriethoxysilane, vinyltriacetoxysilane, γ-chloropropyltrimethoxysilane, hexamethyldisilazane, γ-anilinopropyltrimethoxysilane, vinyltrimethoxysilane, octadecyldimethyl[3-(trimethoxysilyl)propyl]ammonium chloride, γ-chloropropylmethyldimethoxysilane, methyltrichlorosilane, dimethyldichlorosilane, trimethylchlorosilane, allyltriethoxysilane, 3-aminopropylmethyldiethoxysilane, 3-aminopropyltrimethoxysilane, dimethyldiethoxysilane, 1,3-divinyltetramethyldisilazane, and methacryloxyethyldimethyl(3-trimethoxysilylpropyl) ammonium chloride.

Each of these can be used alone or in combination with others.

The content of the silane coupling agent in the coating liquid is not particularly limited and can be suitably selected according to a purpose, but is preferably 0.1 mass % or more to 10 mass % or less relative to the total amount of the silicone resin.

It is preferred that the content of the silane coupling agent be 0.1 mass % or more relative to the total amount of the silicone resin, because a silicone resin thus has improved adhesiveness to core material particles, electrically conductive particles, or the like, allowing prevention of release of a covering layer in long-term use.

It is preferred that the content of the silane coupling agent be 10 mass % or less relative to the total amount of the silicone resin, because filming with toner can thus be prevented in long-term use.

As the silane coupling agent, an appropriately synthesized substance or a commercially-available product may be used.

Examples of commercially-available products of the silane coupling agent include, but are not limited to, in trade name, AY43-059, SR6020, SZ6023, SH6026, SZ6032, SZ6050, AY43-310M, SZ6030, SH6040, AY43-026, AY43-031, sh6062, Z-6911, sz6300, sz6075, sz6079, sz6083, sz6070, sz6072, Z-6721, AY43-004, Z-6187, AY43-021, AY43-043, AY43-040, AY43-047, Z-6265, AY43-204M, AY43-048, Z-6403, AY43-206M, AY43-206E, Z6341, AY43-210MC, AY43-083, AY43-101, AY43-013, AY43-158E, Z-6920, and Z-6940 (manufactured by Toray Silicone Co., Ltd. (present Dow Toray Co., Ltd.))

——Dispersant——

The coating liquid may contain a dispersion liquid in order to stably disperse the inorganic particles for a covering layer.

The dispersant is not particularly limited and can be suitably selected according to a purpose. Examples thereof include, but are not limited to, phosphoric ester-based surfactants, sulfate-based surfactants, sulfonic-acid-based surfactants, and carboxylic-acid-based surfactants.

In particular, phosphoric ester-based surfactants are preferred in view of allowing good dispersion of the inorganic particles for a covering layer as primary particles.

The phosphoric ester-based surfactants preferably contain phosphoric ester as a main component. In other words, the phosphoric ester-based surfactants contain preferably 50 mass % or more and more preferably 90 mass % or more of phosphoric ester.

The content of the dispersant in the coating liquid is preferably 0.5 parts by mass or more to 10.0 parts by mass or less relative to 100 parts by mass of the inorganic particles for a covering layer.

It is preferred that the content of the dispersant be 0.5 parts by mass or more relative to 100 parts by mass of the inorganic particles for a covering layer, because a problem can thus be solved in that all the inorganic particles for a covering layer fail to disperse to form primary particles, resulting in aggregated inorganic particles for a covering layer remaining in a coating liquid. More specifically, such a content is preferred because a problem can thus be solved in that the aggregated inorganic particles for a covering layer remaining in coating liquid are insufficiently fixed to the covering layer, and release by stress in an early stage of printing, thereby reducing resistance and causing carrier deposition. The content described above is also preferred because a problem can thus be solved in that a dispersant is present in a small amount on the outermost surface of the covering layer and cannot provide good rise in electrical charge, offering no advantage over scattering of toner.

It is preferred that the content of the dispersant be 10.0 parts by mass or less relative to 100 parts by mass of the inorganic particles for a covering layer, because a problem can thus be solved in that the coating liquid contains a large amount of a dispersant component less or non-absorbed into the inorganic particles for a covering layer, in other words, the coating liquid has a reduced proportion of the covering layer resin, and thereby that durability of the covering layer is reduced, causing release of the inorganic particles for a covering layer during printing and leading to carrier deposition, scattering of toner, etc.

As the dispersant, an appropriately synthesized substance or a commercially-available product may be used. Examples of the commercially-available product of a dispersant include, but are not limited to, in trade name, SOLSPERSE 2000, SOLSPERSE 2400, SOLSPERSE 2600, SOLSPERSE 2700, and SOLSPERSE 2800 (these are manufactured by AstraZeneca plc); AJIPER PB711, AJIPER PA111, AJIPER PB811, and AJIPER PW911 (these are manufactured by Ajinomoto Co., Ltd.); EFKA-46, EFKA-47, EFKA-48, and EFKA-49 (these are manufactured by EFKA Chemical BV (present BASF SE)); DYSPERBYC 160, DYSPERBYC 162, DYSPERBYC 163, DYSPERBYC 166, DYSPERBYC 170, DYSPERBYC 180, DYSPERBYC 182, DYSPERBYC 184, and DYSPERBYC 190 (these are manufactured by BYK-Chemie GmbH); and FLOWLEN DOPA-158, FLOWLEN DOPA-22, FLOWLEN DOPA-17, G-700, TG-720W, and TG-730W (manufactured Kyoeisha Co., Ltd.)

——Antifoamer——

The coating liquid may contain an antifoamer in order to prevent generation of bubbles in the covering layer.

The antifoamer is not particularly limited and can be suitably selected according to a purpose. Examples thereof include, but are not limited to, silicone-based antifoamers, acryl-based antifoamers, and vinyl-based antifoamers. In particular, silicone-based antifoamers are preferred in view of providing good balance between miscibility and immiscibility with a solvent, and having high antifoaming effect even with addition of a small amount.

The content of the antifoamer in the coating liquid is not particularly limited and can be suitably selected according to a purpose, but is preferably 1.0 parts by mass or more to 10.0 parts by mass or less relative to 100 parts by mass of the coating liquid.

It is preferred that the content of the antifoamer be 1.0 parts by mass or more relative to 100 parts by mass of the coating liquid, because antifoaming effect is thus provided sufficiently.

It is preferred that the content of the antifoamer be 10.0 parts by mass or less relative to 100 parts by mass of the coating liquid, because a problem can thus be solved in that a defect termed "cissing" is generated on a surface of a paint film and thereby makes a covering layer on a surface of the carrier fragile to facilitate release of inorganic particles for a covering layer, causing adhesion of the carrier.

As the antifoamer, an appropriately synthesized substance or a commercially-available product may be used. Examples of commercially-available products of the antifoamer include, but are not limited to, KS-530, KF-96, KS-7708, KS-66, and KS-69 (these are manufactured by Shin-Etsu Chemical Co., Ltd.); TSF451, THF450, TSA720, YSA02, TSA750, and TSA750S (these are manufactured by Momentive Performance Materials Inc.); BYK-065, BYK-066N, BYK-070, BYK-088, and BYK-141 (these are manufactured by BYK-Chemie GmbH); and DISPARLON 1930N, DISPARLON 1933, and DISPARLON 1934 (these are manufactured by Kusumoto Chemicals, Ltd.) The content of the toner in the developer is not particularly limited and can be suitably selected according to a purpose, but is preferably 4 mass % or more to 9 mass % or less relative to the total amount of a developer.

It is preferred that the content of the toner be 4 mass % or more relative to the total amount of a developer, because an appropriate image density is thus provided.

It is preferred that the content of the toner be 9 mass % or less relative to the total amount of a developer, because toner is thus easily retained in a carrier, allowing prevention of scattering of toner.

The blend ratio of the toner to the carrier in the developer is not particularly limited and can be suitably selected according to a purpose, but the blend ratio preferably provides a blend amount of toner of 2 parts by mass or more to 50 parts by mass or less relative to 1 part by mass of a carrier.

It is preferred that the blend amount of toner relative to 1 part by mass of a carrier be 2 parts by mass or more, because the concentration of a carrier is not too high in a developing device, allowing prevention of increase in electrostatic charge of a developer.

It is preferred that the blend amount of toner relative to 1 part by mass of a carrier be 50 parts by mass or less, because the proportion of a carrier in a developer to be supplied into a developing device is thus not too small, causing more exchange of a carrier and allowing prevention of deterioration of the carrier.

With reference to the drawings, description will now be made for the image forming method and the image forming apparatus according to the present embodiment. In each drawing, the same reference numerals are given to the same components, and redundant explanation may be omitted.

FIG. 1 is a schematic view of an image forming apparatus according to the present embodiment. Specifically, FIG. 1 is a schematic view of a tandem-type color laser copier (image forming apparatus) where a plurality of photoconductors are arranged parallelly.

The color laser copier (hereinafter sometimes also referred to as a copier) includes an image forming apparatus 100, a sheet feeding device 200, a scanner 300, a manuscript automatic conveying device 400, etc.

The image forming apparatus 100 has an image forming unit 20 including a process cartridge 18Y, a process cartridge 18M, a process cartridge 18C, and a process cartridge 18K (hereinafter sometimes also referred to as each of the process cartridges) for forming an image with each color of yellow Y, magenta M, cyan C, and black K.

In addition to each of the process cartridges, an optical writing unit 21 as the exposurer, an intermediate transfer unit 17, a secondary-transfer device 22, a pair of registration rollers 49, a belt fixing-type fixing device 25, etc. are arranged. The optical writing unit 21 has a light source, a polygon mirror, a f-θ lens, a reflecting mirror, and the like, and irradiates a surface of a photoconductor with laser light based on image date.

Each of the process cartridges has a drum-shaped photoconductor 1Y, a photoconductor 1M, a photoconductor 1C, or a photoconductor 1K (hereinafter sometimes referred to each of the photoconductors); a charging device as the charger; a developing device 4Y, a developing device 4M, a developing device 4C, or a developing device 4K as the developing unit; a drum cleaning device as the cleaning unit; and a neutralizer as the neutralization unit.

Hereinafter, description will now be made for a yellow process cartridge 18Y, which is an example of each of the process cartridges.

A charging device as a charger evenly charges a surface of the photoconductor 1Y as an image bearer. The charged surface of the photoconductor 1Y is irradiated with laser light modulated or deflected by the optical writing unit 21 as an exposurer, and electric potential of irradiated area (exposed area) is attenuated.

This attenuation causes formation of an electrostatic latent image on a surface of the photoconductor 1Y The formed electrostatic latent image is developed into a toner image by the developing device 4Y as a developing unit.

The toner image formed on the photoconductor 1Y is subjected to primary transfer onto an intermediate transfer belt 110. On the surface of the photoconductor 1Y after primary transfer, post-transfer residual toner is cleaned off by a drum cleaning device as a cleaning unit.

In the process cartridge 18Y, the photoconductor 1Y, which is cleaned by a drum cleaning device, is neutralized by a neutralizer as a neutralization unit. Then, the photoconductor 1Y is evenly charged by a charging device as a charger and return to an initial state.

The series of processes as described so far applies in the same manner to others, i.e., the process cartridges 18M, the process cartridge 18C, and the process cartridge 18K.

Next, the intermediate transfer unit 17 will be described.

The intermediate transfer unit 17 has the intermediate transfer belt 110, a belt cleaning device 90, a stretching roller 14, a driving roller 15, a secondary-transfer backup roller 16, a primary-transfer bias roller 62Y, a primary-transfer bias roller 62M, a primary-transfer bias roller 62C, a primary-transfer bias roller 62K (hereinafter sometimes also referred to as each of the primary-transfer bias rollers), etc.

The intermediate transfer belt 110 is stretched with tension among a plurality of rollers including the stretching roller 14, and endlessly moved in the clockwise direction in FIG. 1 by rotation of the driving roller 15, which is driven by a belt driving motor.

Each of the primary-transfer bias rollers is disposed so as to contact an inner circumferential surface of the intermediate transfer belt 110 and receive a primary-transfer bias applied from a power supply. The intermediate transfer belt 110 is also pressed from the inner circumferential surface toward each of the photoconductors and thereby forms corresponding primary-transfer nips. At each of the primary-transfer nips, the primary-transfer bias causes formation of a primary-transfer electric field between a photoconductor and a primary-transfer bias roller.

For example, a toner image formed on the photoconductor 1Y is primarily transferred onto the intermediate transfer belt 110 by effects of the primary-transfer electric field and nip pressure. On this toner image, toner images formed on respective photoconductors other than the photoconductor 1Y (the photoconductor 1M, the photoconductor 1C, and the photoconductor 1K) are serially superimposed and primarily transferred, thereby forming a four-color superimposed toner image (hereinafter sometimes referred to as a “four-color toner image”) representing a multiple toner image.

The four-color toner image is secondarily transferred onto a transfer paper sheet, serving as a recording sheet, at the secondary-transfer nip described later. After passing through the secondary-transfer nip, post-transfer residual toner remaining on a surface of the intermediate transfer belt 110 is cleaned by the belt cleaning device 90 on the left side in FIG. 1.

Next, the secondary-transfer device 22 will be described.

Below the intermediate transfer unit 17 in FIG. 1, the secondary-transfer device 22 is disposed, including a sheet conveying belt 24 stretching between two stretching rollers 23.

The sheet conveying belt 24 is endlessly moved in the counterclockwise direction in FIG. 1 along with rotary drive of at least any one of the stretching rollers 23. Among the two stretching rollers 23, one roller disposed on the right in FIG. 1 sandwiches the intermediate transfer belt 110 and the sheet conveying belt 24 between itself and the secondary-transfer backup roller 16, and forms a secondary-transfer nip. A secondary-transfer bias having a polarity opposite to a polarity of toner is applied from a power supply to one of the stretching rollers 23, thereby forming, at the secondary-transfer nip, a secondary-transfer electric field to electrostatically move the four-color toner image on the intermediate transfer belt 110 toward a stretching roller 23.

The pair of registration rollers 49 sends the transfer paper sheet to the secondary-transfer nip so as to synchronize with the electrostatic movement of the four-color toner image, and the four-color toner image is secondarily transferred onto the transfer paper sheet by effects of the secondary-transfer electrical field and nip pressure.

Alternatively, for the stretching roller 23, a charger may be provided to charge a transfer paper sheet in a non-contact manner, instead of a secondary-transfer system to apply a secondary-transfer bias.

The sheet feeding device 200 below the image forming apparatus 100 includes a plurality of sheet feed cassettes 44 vertically stacked each of which can store a plurality of transfer paper sheets stacked in bundle.

Each of the sheet feeding cassettes 44 presses a sheet feeding roller 42 against a topmost sheet of the bundled sheets. As the sheet feeding roller 42 is rotated, the topmost transfer sheet is sent toward a sheet feed path 46.

The sheet feed path 46 includes a plurality of pairs of conveyance rollers 47 and the pair of registration rollers 49 that is provided near an end of the sheet feed path 46. The transfer sheet conveyed to the pair of registration rollers 49 is sandwiched between the pair of registration rollers 49.

Meanwhile, in the intermediate transfer unit 17, the four-color toner image formed on the intermediate transfer belt 110 is conveyed into the secondary-transfer nip along with endless movement of the belt. The pair of registration rollers 49 sends the transfer paper sheet at timing that the transfer paper sheet can come into close contact with the four-color toner image. At the secondary-transfer nip, the close contact of the four-color toner image on the intermediate transfer belt 110 with the transfer sheet causes the four-color toner image to be secondarily transferred onto the transfer paper sheet, thus forming a full-color image.

The transfer paper sheet with a full-color image formed thereon passes through the secondary-transfer nip along with endless movement of the sheet conveying belt 24, and then is sent from the sheet conveying belt 24 to the fixing device 25.

The fixing device 25 includes a belt unit that stretches and endlessly moves a fixing belt 26 by two rollers, and a pressure roller 27 that is pressed against one of the rollers in the belt unit. The fixing belt 26 and the pressure roller 27 contact each other to form a fixing nip and interposes the transfer paper sheet received from the sheet conveying belt 24 into the fixing nip.

Among the two rollers in the belt unit, a roller pressed from the pressure roller 27 includes a heat source inside that heats the fixing belt 26 by heat generation. The fixing belt 26 thus heated heats the transfer paper sheet interposed in a fixing nip. The full-color image is fixed to the transfer paper sheet by effects of the heating and nip pressure.

The transfer paper sheet via the fixing in the fixing device 25 is stacked on a stacking section 57 protruded from the left side of a printer housing in FIG. 1, or is returned to the aforementioned secondary-transfer nip to form a toner image on the other face of the transfer paper sheet.

Next, a method of forming a full-color image will be described below.

A color manuscript is set on a manuscript table 30 in the manuscript automatic conveying device (automatic delivery feeder: ADF) 400. Alternatively, after the manuscript automatic conveying device 400 is opened, a color manuscript is set on a contact glass 32 in the scanner 300, and the manuscript automatic conveying device 400 is closed.

In the case that a color manuscript is set on the manuscript table 30 in the manuscript automatic conveying device 400, a color manuscript is conveyed upon a press of a start button and delivered onto the contact glass 32, and then the scanner 300 operates to cause running of a first running portion 33 and a second running portion 34 each of which includes a light source. On the other hand, in the case that a manuscript is set on the contact glass 32, the scanner 300 promptly operates to cause running of the first running portion 33 and the second running portion 34, each of which includes a light source. At that time, the first running portion 33 emits light that is then reflected on a surface of a manuscript. The reflected light is reflected on a mirror of the second running portion 34, then passes through an imaging forming lens 35, and is received by a reading sensor 36, thereby reading a color manuscript (color image) and providing image information of black, yellow, magenta, and cyan.

In parallel with such a manuscript reading operation, each instrument in each of the process cartridges, the intermediate transfer unit 17, the secondary-transfer device 22, and the fixing device 25 initiate to operate separately. Then, on the basis of the image information constructed by the reading sensor 36, the optical writing unit 21 is controlled and driven to form a toner image on each of the photoconductor. These toner images are to be superimposed and transferred onto the intermediate transfer belt 110 to form a four-colored toner image.

At substantially the same time as the start of the manuscript reading operation, a sheet feeding operation starts in the sheet feeding device 200. One of the sheet feeding rollers 42 is selectively rotated, and transfer paper sheets are sent from a corresponding one of the sheet feeding cassettes 44 stacked in a paper bank 43. The transfer paper sheets thus sent are separated one by one with a separation roller 45, delivered into the sheet feed path 46, and conveyed toward the secondary-transfer nip with the pair(s) of conveyance rollers 47.

Instead of such sheet feeding from the sheet feeding cassette 44, transfer paper sheets may be also fed from a manual sheet feeding tray 51. In such case, a manual sheet feeding roller 50 is selectively rotated to send the transfer paper sheets on the manual sheet feeding tray 51, and then a separation roller 52 separates and feeds the transfer paper sheets one by one to a manual sheet feeding path 53 in the image forming apparatus 100.

When forming a multi-colored image of two or more color toners, the copier holds the upper extending face of the intermediate transfer belt 110 substantially horizontal so that the upper extending surface contacts each of the photoconductors. On the other hand, when forming a monochrome image consisting of black (K) toner, the intermediate transfer belt 110 is tilted to the lower-left in FIG. 1 so as to separate the upper extending face of the intermediate transfer belt 110 from each of the photoconductors other than the photoconductor 1K (the photoconductors 1Y, 1M, and 1C). Then, the photoconductor 1K is singly rotated in the counterclockwise direction in FIG. 1 to form a K toner image. At that time, drive of the developing device 4Y, the developing device 4M, and the developing device 4C is preferably stopped, thereby preventing each of the photoconductor and a developer from wasting.

The copier may include a control section including a CPU and the like to control the components described below in the copier, and an operation display including a liquid crystal display, various key buttons, and the like.

An operator can perform key input operations through the operation display to send commands to the control unit, and thereby select a direct ejection mode, a reverse ejection mode, or a reverse decurling ejection mode for one-sided printing, which forms an image on one side of a transfer paper sheet.

Figure 2:
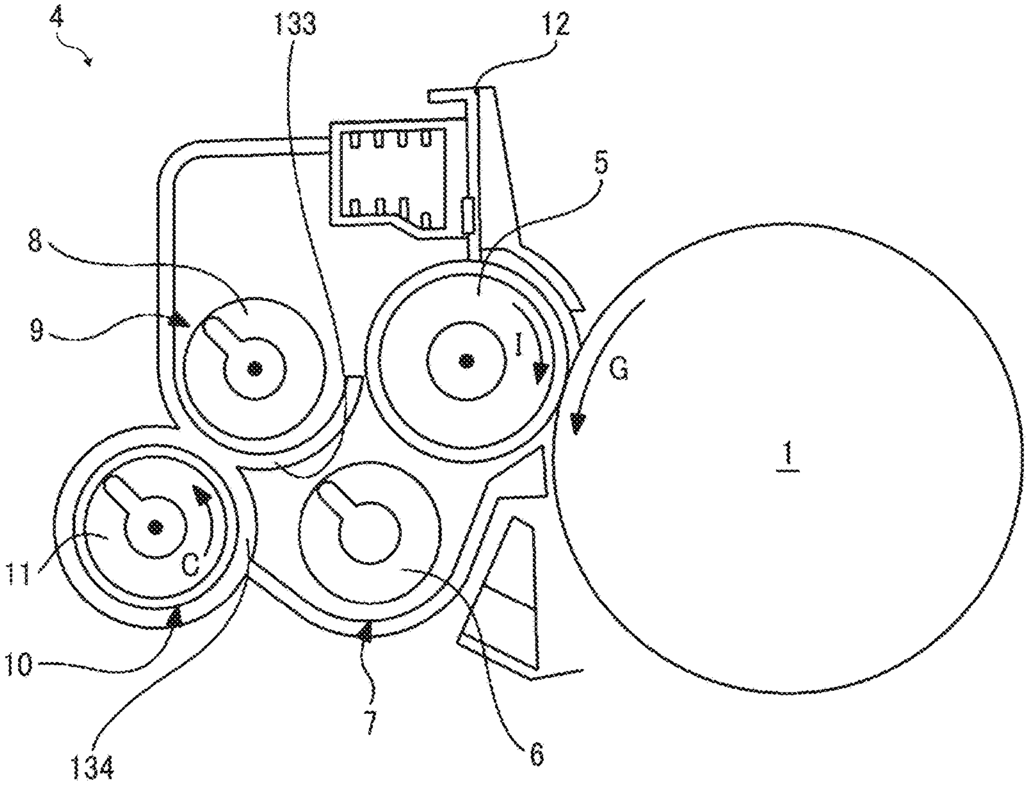
FIG. 2 is an enlarged schematic view of a developing unit according to an embodiment of the present invention.

FIG. 2 is a schematic view of a developing unit according to the present embodiment. Specifically, FIG. 2 is an enlarged schematic view of a developing device included in a process cartridge, and a photoconductor.

A developing device 4 as the developing unit has a developing roller 5 as a developer bearer, a collecting screw 6 as a developer collecting conveyer, a supplying screw 8 as a developer supplying conveyer, a stirring conveyance path 10 as a developer stirring conveyance path, a stirring screw 11 as a developer stirring conveyer, and a developing doctor 12 as a developer regulator.

The developing roller 5 supplies toner to an electrostatic latent image on a surface of a photoconductor 1 with rotating in the direction of an arrow I in the drawing.

The shape of the developing roller 5 is not particularly limited and can be suitably selected according to a purpose. Examples thereof include, but are not limited to, a configuration where a gap between the developing doctor 12 and the photoconductor 1 is adjusted to have a width of about 0.3 mm using a φ25 mm aluminum raw tube.

The developing roller 5 preferably has a surface having vertical grooves or treated with sandblast.

The supplying screw 8 conveys a developer toward the front of FIG. 2 with respect to the plane of the drawing with supplying a developer to the developing roller 5.

The developing roller 5 and the supplying screw 8 face the developing doctor 12 as a developer regulator that adjusts a developer supplied to the developing roller 5 to provide a thickness suitable for developing.

A material of the developing doctor 12 is not particularly limited and can be suitably selected according to a purpose, but is preferably stainless steel.

The size, structure, and shape of the developing doctor 12 are not particularly limited and can be suitably selected according to a purpose, as long as a developer supplied to a developing roller can be adjusted to provide a thickness suitable for developing.

The developing roller 5 and the photoconductor 1 face the collecting screw 6 as a developer collecting conveyer that collects a developer passed through a developing section and conveys the developer in the same direction as the supplying screw 8.

In the longitudinal direction of the developing roller 5, a supplying conveyance path 9, which is a developer supplying conveyance path including the supplying screw 8, is parallelly arranged. Below the developing roller 5, a collecting conveyance path 7 is parallelly arranged as a developer collecting conveyance path including the collecting screw 6.

In addition, the stirring conveyance path 10 is disposed as a developer stirring conveyance path so as to be present below the supplying conveyance path 9 and arranged parallel to the collecting conveyance path 7. The stirring conveyance path 10 includes the stirring screw 11 as a developer stirring conveyer that conveys a developer in an opposite direction to that of the supplying screw 8 (toward the back of FIG. 2 with respect to the plane of the drawing) with stirring the developer.

The supplying conveyance path 9 and the stirring conveyance path 10 are partitioned by a first partition wall 133 as a partition. The first partition wall 133 includes an opening to communicate the supplying conveyance path 9 with the stirring conveyance path 10 on the front side and backside of FIG. 2.

The supplying conveyance path 9 and the collecting conveyance path 7 are partitioned by the first partition wall 133, but the supplying conveyance path 9 and the collecting conveyance path 7 have no opening to communicate with each other.

The stirring conveyance path 10 and the collecting conveyance path 7 are partitioned by a second partition wall 134 as a partition. The second partition wall 134 includes an opening to communicate the stirring conveyance path 10 with the collecting conveyance path 7 on the front side of FIG. 2.

Materials of the supplying screw 8, the collecting screw 6, and the stirring screw 11 are not particularly limited and can be suitably selected according to a purpose, but are preferably resins.

The shapes of the supplying screw 8, the collecting screw 6, and the stirring screw 11 are not particularly limited and can be suitably selected according to a purpose. Examples thereof include, but are not limited to, a screw with a screw diameter of φ18 mm and a screw pitch of 25 mm.

The rotation frequency of the supplying screw 8, the collecting screw 6, and the stirring screw 11 is not particularly limited and can be suitably selected according to a purpose, but is preferably 600 rpm.

The photoconductor 1 is charged on the surface by a charging device with rotating in a direction of an arrow G in FIG. 2. On the charged surface of the photoconductor 1, laser light emitted by an exposure device forms an electrostatic latent image. To the electrostatic latent image, toner is supplied from the developing device 4 as the developing unit, thereby forming a toner image.

A post-developing developer is conveyed via the collecting conveyance path 7 toward the front of FIG. 2, and then delivered from an opening of the first partition wall 133 to the stirring conveyance path 10. At that time, a developer is supplied from the stirring conveyance path 10, in the vicinity of an opening of the first partition wall 133 on the upstream of a developer conveyance route in the stirring conveyance path 10.

Figure 3:
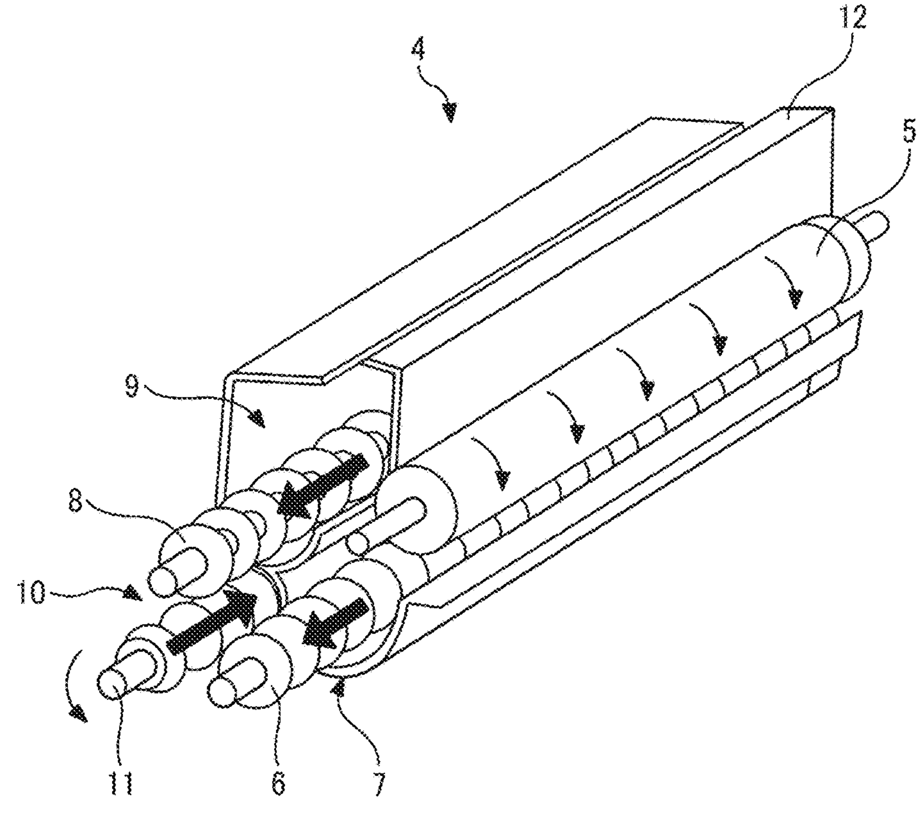
FIG. 3 is a perspective schematic view for illustrating a flow of a developer.

FIG. 3 is a perspective schematic view for illustrating a flow of a developer. Specifically, FIG. 3 is a perspective schematic view for illustrating a flow of a developer in a developer conveying pathway of the collecting conveyance path 7, the supplying conveyance path 9, and the stirring conveyance path 10. Each bold arrow in FIG. 3 indicates a direction of movement of a developer.

Figure 4:
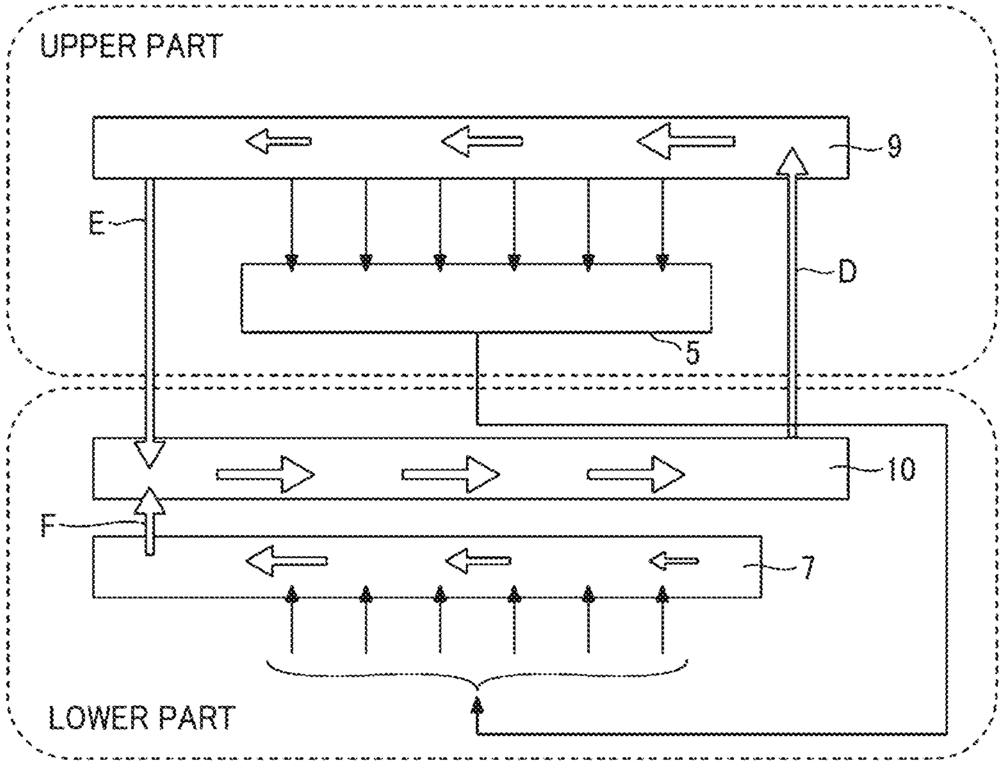
FIG. 4 is a pattern diagram for illustrating a flow of a developer.

FIG. 4 is a pattern diagram for illustrating a flow of a developer. Each bold arrow in FIG. 4 indicates a direction of movement of a developer.

The supplying conveyance path 9 receives supply of a developer from the stirring conveyance path 10, and conveys the developer toward the downstream of a conveyance route of the supplying screw 8 along with supplying the developer to the developing roller 5. A developer not supplied to the developing roller 5 and unused for developing (i.e., excess developer) is conveyed to the downstream end of a conveyance route in the supplying conveyance path 9, and then supplied from an opening of the first partition wall 133 to the stirring conveyance path 10 (see an arrow E in FIG. 4).

A post-developing developer is collected from the developing roller 5 to the collecting conveyance path 7. The developer is conveyed by the collecting screw 6 to the downstream end of a conveyance route in the collecting conveyance path 7 (i.e., a collected developer), and then supplied from an opening of the second partition wall 134 to the stirring conveyance path 10 (see an arrow F in FIG. 4).

The stirring conveyance path 10 stirs the excess developer and the collected developer; conveys these developers to one side that is the downstream of a conveyance route of the stirring screw 11 as well as the upstream of a conveyance route of the supplying screw 8; and supplies the developers from an opening of the first partition wall 133 to the supplying conveyance path 9 (see an arrow D in FIG. 4).

In the stirring conveyance path 10, the stirring screw 11 conveys the collected developer, the excess developer, and a developer to be supplied, in a direction opposite to the conveyance direction in the collecting conveyance path 7 and the supplying conveyance path 9, and supplies a stirred developer to the upstream of a conveyance route in the supplying conveyance path 9, in which the upstream of a conveyance route communicate with the downstream of a conveyance route in the stirring conveyance path 10. In addition, a toner concentration sensor may be disposed below the stirring conveyance path 10, and the sensor may produce an output to operate a developer supply controlling device to perform toner supply from a developer storage.

The developing device depicted in FIG. 4 includes the supplying conveyance path 9 and the collecting conveyance path 7, and performs supply and collection of a developer in different developer conveyance paths, thus avoiding contamination of a post-developing developer into the supplying conveyance path 9. Accordingly, at a site closer to the downstream end of a conveyance route in the supplying conveyance path 9, a developer supplied to the developing roller 5 can be further prevented from reduction in the concentration of toner.

The developing device also includes the collecting conveyance path 7 and the stirring conveyance path 10, and performs supply and collection of a developer in different developer conveyance paths, thus avoiding dropping of a post-developing developer during stirring. Accordingly, a developer stirred sufficiently is supplied to the supplying conveyance path 9, thus avoiding insufficient stirring of a developer to be supplied to the supplying conveyance path 9.

Such a structure can prevent reduction in the concentration of toner in a developer in the supplying conveyance path 9, and avoid insufficient stirring of a developer in the supplying conveyance path 9, thus providing a constant image density during developing.

Figure 5:
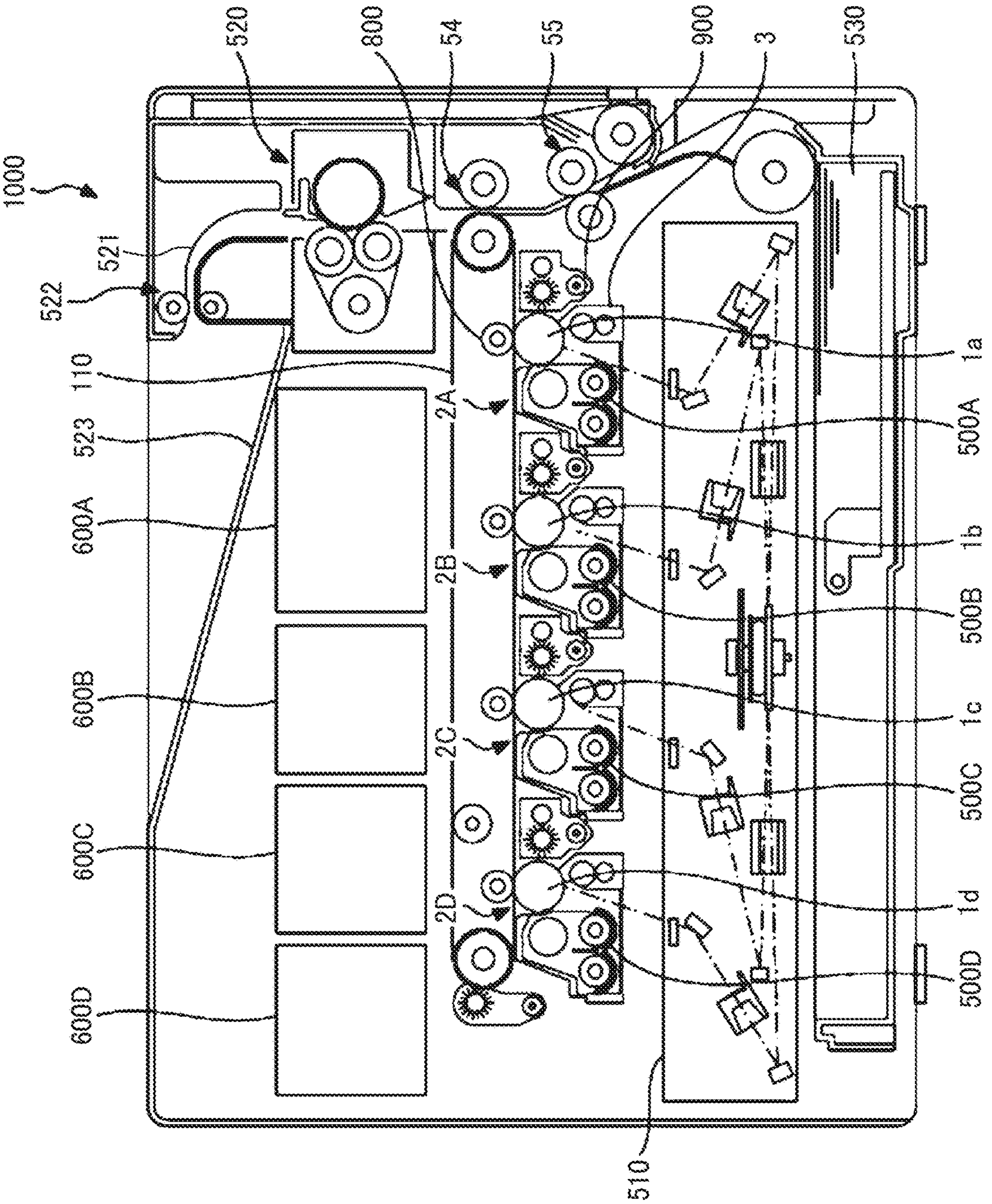
FIG. 5 is a schematic view of an image forming apparatus according to an embodiment of the present invention.

FIG. 5 is a schematic view of an image forming apparatus according to another embodiment.

An image forming apparatus 1000 has an image forming unit 2A, an image forming unit 2B, an image forming unit 2C, and an image forming unit 2D (hereinafter sometimes referred to as each of the image forming units 2), each of which is removable. A process cartridge may also be used as the image forming unit 2.

The image forming units 2 are units each having the same configuration, and can be e.g., an aspect where the image forming unit 2A forms an image corresponding to magenta color, the image forming unit 2B forms an image corresponding to cyan color, the image forming unit 2C forms an image corresponding to yellow color, and the image forming unit 2D forms an image corresponding to black color.

Each of the image forming units 2 have a photoconductor 1*a*, a photoconductor 1*b*, a photoconductor 1*c*, or a photoconductor 1*d* (hereinafter referred to as each of the photoconductors 1) as the image bearer.

In the approximate center of the image forming apparatus 1000, a charging unit 3 is disposed as the charger.

In the approximate center of the image forming apparatus 1000, an intermediate transfer belt 110 is attached.

The intermediate transfer belt 110 is disposed so as to contact each of the photoconductors 1 in each of the image forming units 2, and arranged among a plurality of rollers so as to rotate in the counterclockwise direction in FIG. 5. A primary-transfer roller 800 applies a bias between itself and the photoconductor 1, and transfers developed toner onto the intermediate transfer belt 110. A cleaning unit 900 cleans the photoconductor 1 after toner transfer.

Each of the image forming units 2 has, as the developing unit, a developing device 500A, a developing device 500B, a developing device 500C, or a developing device 500D (hereinafter sometimes referred to as each of the developing devices 500) corresponding to toner color.

For each of the developing devices 500 in each of the image forming units 2, a developer according to the present embodiment is used.

Each of the developing device 500 employs a developing mode to supply a fresh developer different from toner and a carrier inside each of the developing device 500, as well as to discharge a developer existing inside each of the developing device 500, thereby exchanging a developer inside each of the developing devices 500.

In the exchange of a developer inside each of the developing devices 500, a developer concentration sensor may be disposed inside each of the developing devices 500, to be set a frequency of the exchange of a developer corresponding to output of the developer concentration sensor.

Above each of the image forming units 2, a developer supplying device 600A, a developer supplying device 600B, a developer supplying device 600C, or a developer supplying device 600D (hereinafter sometimes referred to as each of the developer supplying devices 600) is disposed as the supplying unit.

Each of the developer supplying devices 600 is a device for supplying fresh toner and a fresh carrier (a fresh developer) to each of the developing devices 500, as described above.

Below each of the image forming units 2, an exposure device 510 is disposed as the exposurer.

The exposure device 510 is not particularly limited and can be suitably selected according to a purpose. Examples thereof include, but are not limited to, a device including four light sources with a laser diode (LD) system prepared for respective colors, a polygon scanner including six polygon mirrors and a polygon motor, a fΘ lens disposed on a light path of each light source, a lens such as a long cylindrical lens, etc.

Laser light emitted from a laser diode is subjected to deflection scanning by a polygon scanner and irradiated to each of the photoconductors 1.

Between the intermediate transfer belt 110 and each of the developer supplying devices 600, a fixing device 520 is disposed to fix an image transferred onto a transfer paper sheet.

On the downstream of a conveyance route of a transfer paper sheet in the fixing device 520, a paper ejection path 521 is disposed and constructed in such a manner that a transfer paper sheet is conveyed to the paper ejection path 521 and ejected by a pair of paper ejection rollers 522 to a paper ejection tray 523.

At a lower part of the image forming apparatus 1000, a sheet feeding cassette 530 to store a transfer paper sheet is disposed.

Next, operation in image formation with the image forming apparatus 1000 will be described.

Upon start of operation of image formation, each of the photoconductors 1 separately rotates in the clockwise direction in FIG. 5. A charging roller in the charging unit 3 as the charger charges evenly a surface of each of the photoconductors 1.

The exposure device 510 irradiates: laser light corresponding to a magenta image onto the photoconductor 1*a* in the image forming unit 2A; laser light corresponding to a cyan image onto the photoconductor 1*b* in the image forming unit 2B; laser light corresponding to a yellow image onto the photoconductor 1*c* in the image forming unit 2C; and laser light corresponding to a black image onto the photoconductor 1*d* in the image forming unit 2D; and separately forms distinct electrostatic latent images each corresponding to a piece of image data for each color. By rotation of each of the photoconductors 1, each electrostatic latent image formed on the corresponding photoconductor 1 reach a position of the corresponding developing device 500 and is immediately developed by a developer of a corresponding color, thereby forming a four-colored toner image.

Meanwhile, a transfer paper sheet in the sheet feeding cassette 530 is conveyed to the intermediate transfer belt 110 by a pair of registration rollers 55 so as to be timed to coincide with formation of the toner image. The transfer paper sheet is charged by a paper attraction roller 54, and conveyed with being electrostatically attracted to a surface of the intermediate transfer belt 110. At this process, the respective color toner images of magenta, cyan, yellow, and black are serially transferred, thereby forming, on the transfer paper sheet, a full-color toner image with four colors superimposed.

Once the fixing device 520 applies heat and pressure, the toner image melts and fixes to the transfer paper sheet. Then, the transfer paper sheet passes through a paper ejection path, and is ejected to the paper ejection tray 523 on an upper part of the image forming apparatus 1000.

Figure 6:
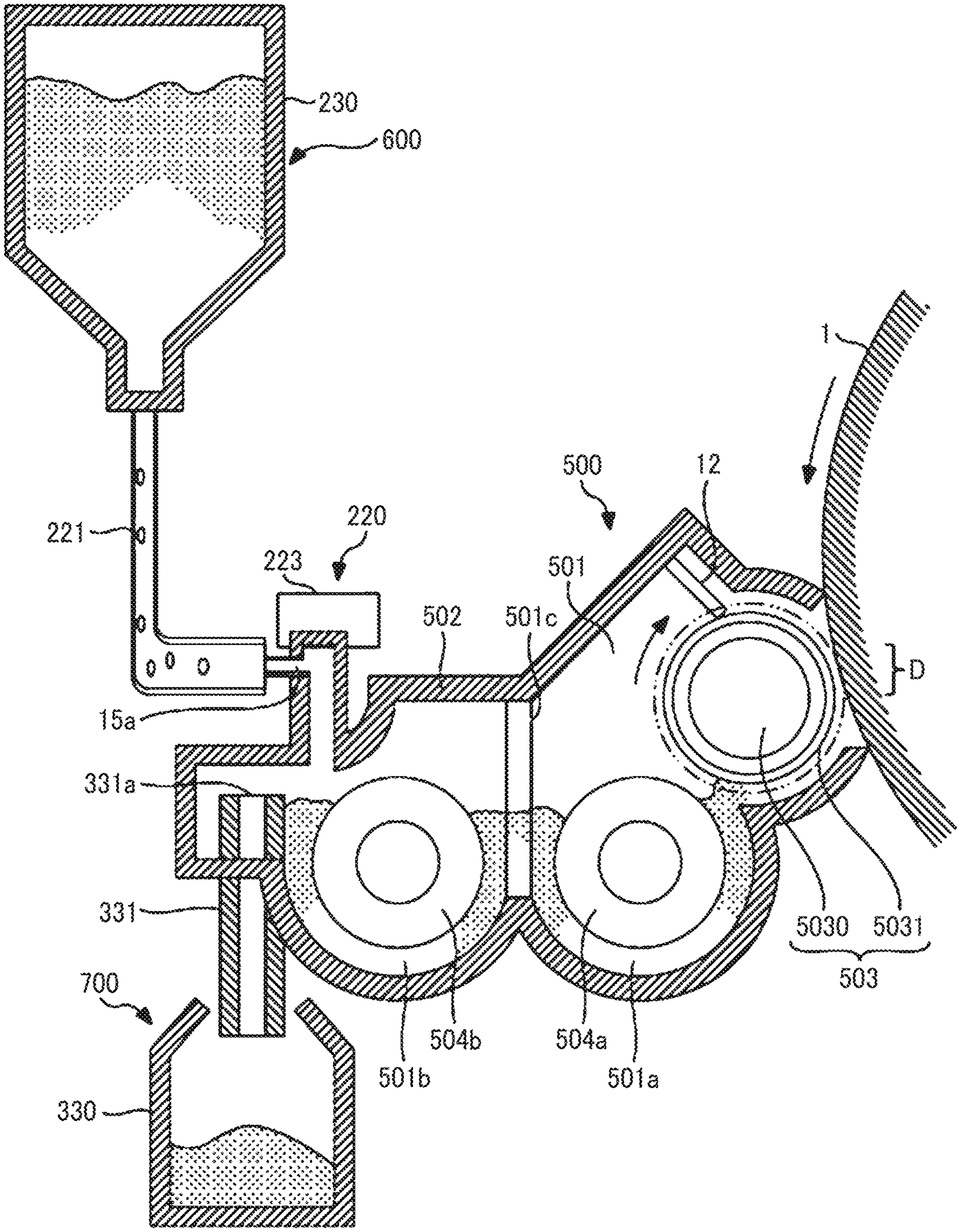
FIG. 6 is a schematic view of a developing unit according to an embodiment of the present invention, and the surroundings thereof.

FIG. 6 is a schematic view of a developing unit according to the present embodiment and the surroundings thereof.

Above each of the developing devices 500, each of the developer supplying devices 600 is disposed as the carrier supplying unit, which supplies a fresh developer containing fresh toner and a fresh carrier into the corresponding developing device 500.

Below each of the developing devices 500, a developer discharging device 700 is disposed as the developer discharging unit, which discharges a developer excessively present in each of the developing devices 500.

Each of the developing devices 500 has a main part that includes a housing 502 having a developer storage section 501 to store a two-component developer containing toner and a carrier, a developing roll 503, a conveying screw 504*a* and a conveying screw 504*b*, and a developing doctor 12.

The developer storage section 501 is separated into two compartments, a storage space 501*a* and a storage space 501*b*, by a dividing wall 501*c*, which is placed in an approximate center of the developer storage section 501.

The storage space 501*a* and the storage space 501*b* have openings on both ends of the front side and backside of FIG. 6, and communicate with each other. The conveying screw 504*a* rotating inside the storage space 501*a* and the conveying screw 504*b* rotating inside the storage space 501*b* cause a developer to circulate between the storage space 501*a* and the storage space 501*b* with being stirring.

The developing roll 503 is a cylindrical sleeve 5031 that includes a magnet roll 5030 fixed inside and performs rotary drive.

The developing roll 503 is placed close to an opening of the housing 502, and disposed so as to rotate in proximity to each of the photoconductors 1.

The developing doctor 12 has a double structure with a non-magnetic member and a magnetic member, and includes a tip disposed so as to face a predetermined magnetic pole of the magnet roll 5030.

The developing doctor 12 is disposed with being pressed against or close to a surface of the developing roll 503.

The developer discharging device 700 includes a collecting container 330 to collect a developer excessively present in the developer storage section 501, and a discharging pipe 331 as a developer discharging unit to send to the collecting container 330 the excessive developer overflowing from the developer storage section 501.

The discharging pipe 331 is disposed so as to have an upper opening 331*a* positioned at a predetermined height inside the developer storage section 501, and has a configuration to discharge a developer in an amount exceeding the upper opening 331*a*.

The developer discharging device 700 is not limited to the aforementioned configuration, and may have a configuration e.g., that includes a developer outlet opened at a predetermined site in the housing 502, and a conveyer such as a discharging screw as a developer discharging unit positioned close to the developer outlet, thereby conveying a developer discharged from the developer outlet to the collecting container 330.

Additionally, the developer discharging device 700 may have a configuration including a discharging screw at an end or the inside of the discharging pipe 331 in the embodiment.

Figure 7:
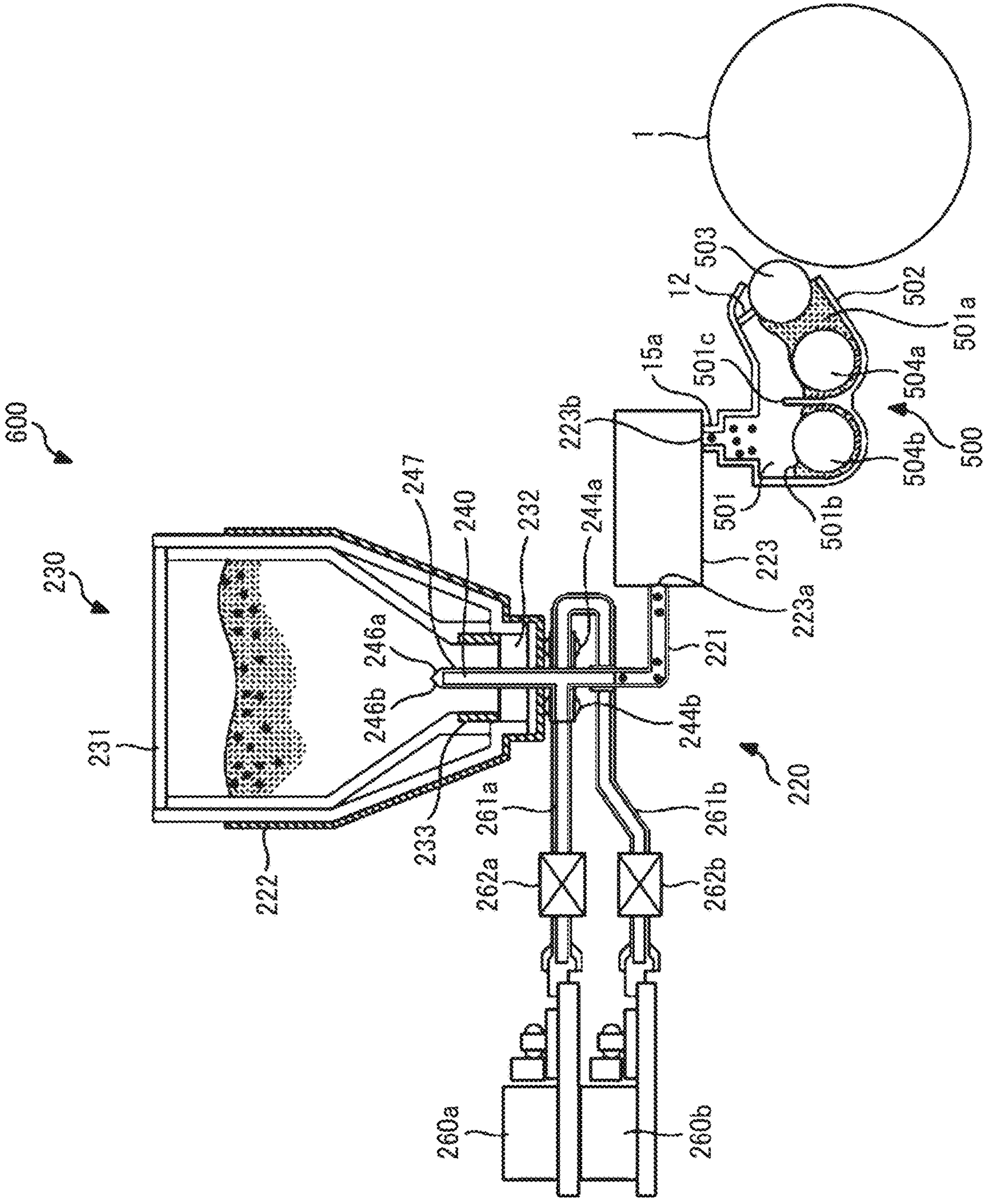
FIG. 7 is a schematic view of a carrier supplying unit according to an embodiment of the present invention.

FIG. 7 is a schematic view of a developer supplying unit according to the present embodiment.

Inside a developer storage container 230 in the developer supplying device 600 as the carrier supplying unit, a developer storage member 231 is disposed as a bag-shaped member that can be reduced in volume.

A fresh developer to be supplied to each of the developing devices 500 is stored inside the developer storage member 231. The developer storage member 231 is reduced in volume along with reduction in inner pressure due to supply of a fresh developer to the developer storage section 501.

The developer supplier 220 includes a screw pump 223 joined to an upper end of a supplying port 15*a* opened at a predetermined site in the housing 502, a nozzle 240 coupled to the screw pump 223, and an air supplying unit 260*a* and an air supplying unit 260*b* coupled to the nozzle 240, and operates corresponding to a detection signal from a developer concentration sensor or the like installed in developer storage section 501 to supply an appropriate amount of a developer from the developer storage container 230 to the developer storage section 501.

Between the screw pump 223 and the nozzle 240, a conveying tube 221 is present as a developer conveyance passage to communicate with the screw pump 223.

A material of the conveying tube 221 is not particularly limited and can be suitably selected according to a purpose, but is preferably a rubber material such as polyurethane, nitrile, or EPDM, in view of flexibility and good toner resistance.

The developer supplying device 600 has a container holder 222 for supporting the developer storage container 230.

A material of the container holder 222 is not particularly limited and can be suitably selected according to a purpose, and is preferably e.g., a highly rigid material such as a resin.

The developer storage container 230 has a developer storage member 231 as a bag-shaped member formed of a soft sheet material, and a metal cap 232 as an outlet forming member to form a developer outlet.

A material of the developer storage member 231 is not particularly limited and can be suitably selected according to a purpose, but is preferably a resin such as a polyester resin, a polyethylene resin, a polypropylene resin, a polystyrene resin, a polyvinylchloride resin, a polyacrylic acid, a polycarbonate resin, an ABS resin, or a polyacetal resin, in view of providing good dimension accuracy.

The shape of the developer storage member 231 is not particularly limited and can be suitably selected according to a purpose, but is preferably cylindrical, more preferably cylindrical and with spiral-shaped projections and recesses formed on an inner circumferential face, even more preferably cylindrical and with spiral-shaped projections and recesses formed on an inner circumferential face in which a portion or all of the spiral has an accordion function. It is preferred that the spiral-shaped projections and recesses be formed, because rotation of the developer storage container 230 allows smooth transport of a developer stored inside the developer storage member 231 to an outlet part.

The size, shape, and structure of the developer storage member 231 are not particularly limited and can be suitably selected according to a purpose.

The metal cap 232 is equipped with a seal material 233 formed of sponge, rubber, etc.

The seal material 233 has a cross-shaped cut, and passing the nozzle 240 of the developer supplier 220 through the cut provides communication and fixation between the developer storage container 230 and the developer supplier 220.

In the present embodiment, the metal cap 232 is disposed below the developer storage container 230.

The state of the metal cap 232 disposed below represents that with the developer storage container 230 disposed in the developer supplying device 600, the metal cap 232 is placed at a position such that the metal cap 232 has a downward vertical component in the developer storage container 230.

The position of the metal cap 232 in a developer storing container body is not limited thereto. With the developer storage container 230 disposed in the developer supplying device 600, the metal cap 232 may be placed in a horizontal or oblique direction of the developer storage container 230 body.

The developer storage container 230 is serially exchanged to a new one corresponding to consumption of a developer. Having the aforementioned configuration, the developer storage container 230 in the present embodiment allows the attachment and detachment with ease, and enables prevention of leakage during exchange or use.

The developer storage container 230 is easily attached to and detached from the developer supplying device 600, is suitable for preservation, transport, etc., and provides good handling.

Figure 8A:
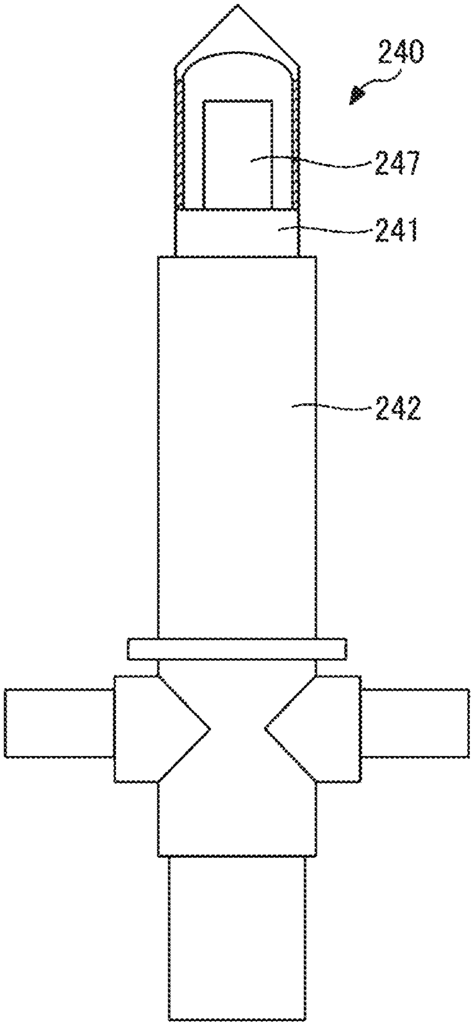
FIG. 8A is a schematic view of a nozzle provided in a carrier supplying unit according to an embodiment of the present invention.

FIG. 8A is a schematic view of a nozzle provided in a developer supplying unit according to the present embodiment.

Figure 8B:
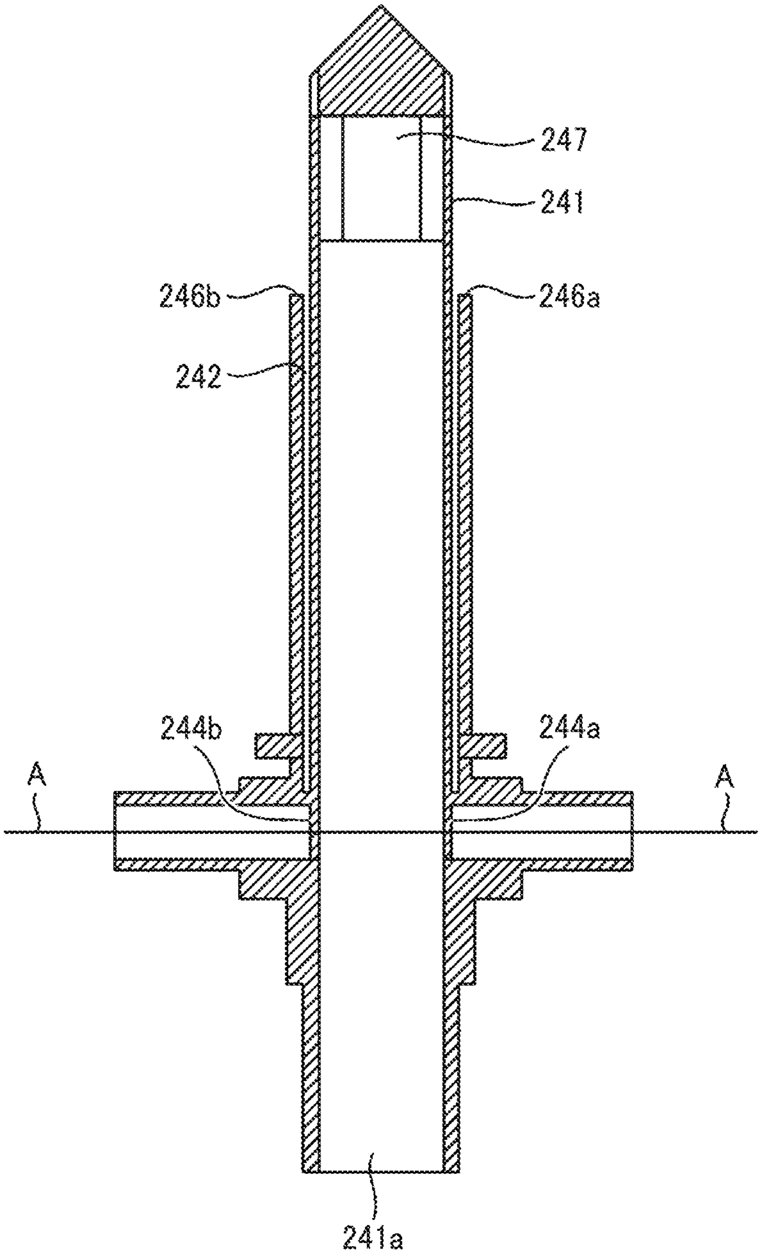
FIG. 8B is an axial cross sectional view of the nozzle illustrated in FIG. 8A.

FIG. 8B is an axial cross sectional view of the nozzle illustrated in FIG. 8A.

Figure 8C:
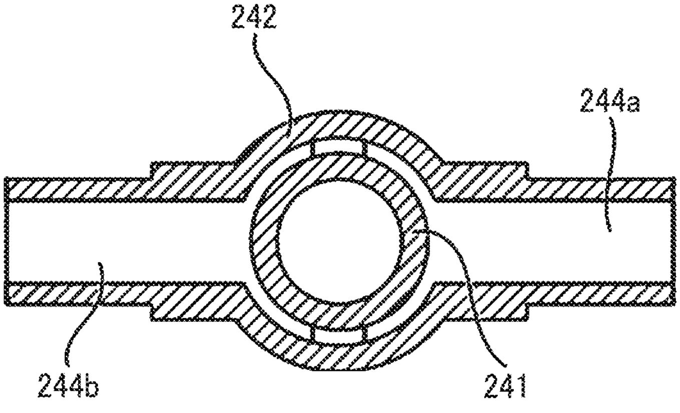
FIG. 8C is a cross-sectional view taken along the line A-A in FIG. 8B.

FIG. 8C is a cross-sectional view taken along the line A-A in FIG. 8B.

As present in FIG. 8B, the nozzle 240 has a double tube structure including an inner tube 241 and an outer tube 242 storing the inner tube 241. The inside of the inner tube 241 is a developer flow path 241*a* as a developer conveyance path to discharge a developer inside the developer storage container 230.

The developer inside the developer storage container 230 is drawn by the screw pump 223, passes through the developer flow path 241*a*, and is attracted into the screw pump 223.

Figure 9:
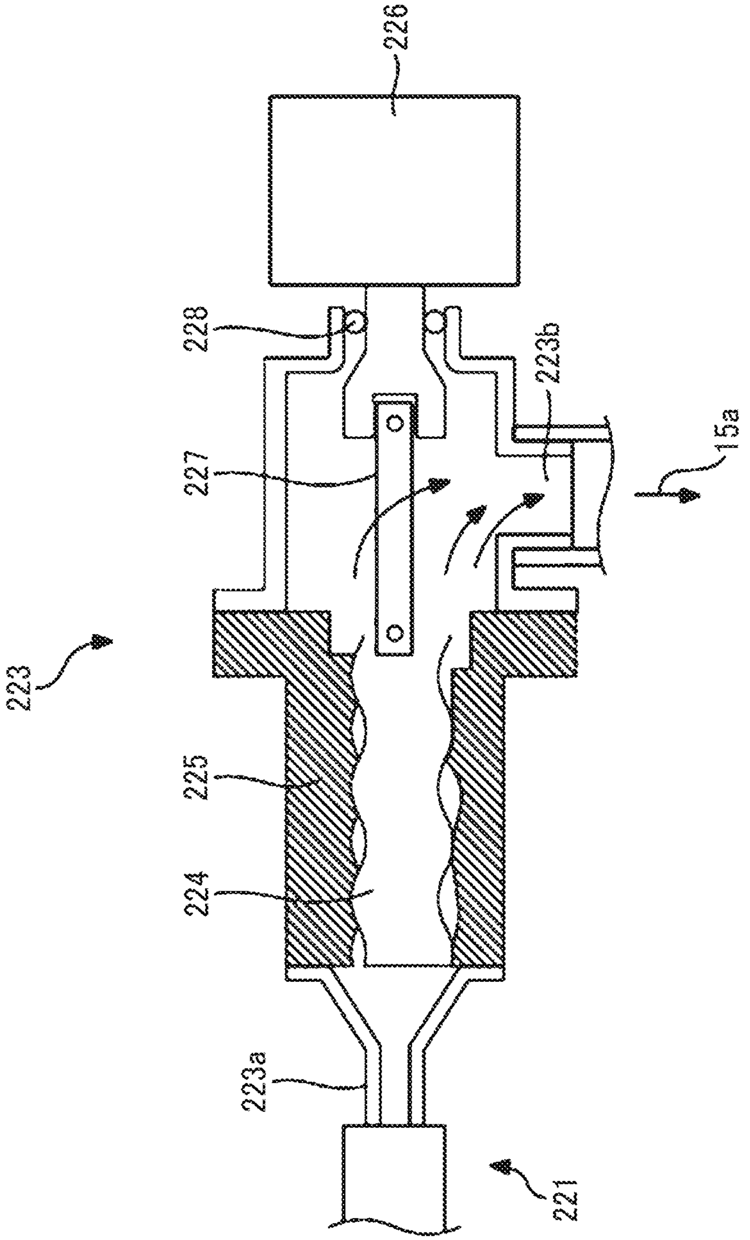
FIG. 9 is a schematic cross-sectional view of a screw pump in a carrier supplying unit according to an embodiment of the present invention.

FIG. 9 is a schematic cross-sectional view of a screw pump in a carrier supplying unit according to the present embodiment.

The screw pump 223 is referred to as a uniaxial eccentric screw pump, and includes a rotor 224 and a stator 225.

The rotor 224 is formed of a hard material, has a circular cross section spirally twisted, and is fitted inside the stator 225. The stator 225 is formed with a rubber-like soft material, has a hole with an elliptic cross section spirally twisted, into which the rotor 224 is fit.

The stator 225 has a spiral pitch formed with twice the length of the spiral pitch of the rotor 224.

The rotor 224 is coupled to a driving motor 226 for performing rotary drive of the rotor 224 via a universal joint 227 and a bearing 228.

A developer is conveyed from the developer storage container 230 via the developer flow path 241*a* and the conveying tube 221, enters the screw pump 223 from a developer drawing port 223*a*, and then penetrates into a space formed between the rotor 224 and the stator 225. The developer is drawn and conveyed toward the right in FIG. 9 along with rotation of the rotor 224, drops downward from a developer dropping port 223*b*, and is supplied into the developing device 500.

The developer supplier 220 used in the present embodiment may include the air supplying unit 260*a* and the air supplying unit 260*b* to supply air into the developer storage container 230.

As present in FIG. 7, an air flow path 244*a* and an air flow path 244*b* are coupled to the air supplying unit 260*a* and the air supplying unit 260*b* as separate gas sending devices via an air supplying path 261*a* and an air supplying path 261*b* as gas supplying passages, respectively.

As present in FIG. 8B, the air flow path 244*a* and the air flow path 244*b* are disposed as air supplying passages between the inner tube 241 and the outer tube 242 in the nozzle 240 of the developer supplier 220. In addition, as present in FIG. 8C, the air flow path 244*a* and the air flow path 244*b* mutually independently have a semicircular cross section.

As the air supplying unit 260*a* and the air supplying unit 260*b*, an air pump with a common diaphragm shape can be utilized. Air is sent from the air supplying unit 260*a* and the air supplying unit 260*b*, separately passes through the air flow path 244*a* and the air flow path 244*b*, and is supplied from an air supplying port 246*a* and an air supplying port 246*b* as gas supplying ports of the distinct air flow paths into the developer storage container 230. The air supplying port 246*a* and the air supplying port 246*b* are positioned below a developer outflow port 247 in the drawing as a developer outlet of the developer flow path 241*a*. The air supplied from the air supplying port 246*a* and the air supplying port 246*b* is supplied to a developer near the developer outflow port 247.

Even when a developer around the developer outflow port 247 is solidified to generate occlusion due to long-term neglect with disuse, the configuration as described above enables crush of a developer closing the developer outflow port 247.

For the air supplying port 246*a* and the air supplying port 246*b*, an opening and closing valve 262*a* and an opening and closing valve 262*b* are disposed as opening and closing units that performs opening and closing by a control signal from a regulatory section as a gas sending control unit.

The opening and closing valve 262*a* and the opening and closing valve 262*b* operates to open valves to let air pass through upon receiving an ON signal from the regulatory section, and to close valves to block passing of air upon receiving an OFF signal from the regulatory section.

Next, a developing operation of a developing device will be described with reference to FIGS. 6 to 7.

As present in FIG. 6, a developer preliminarily contained in the developer storage section 501 is stirred and frictionally charged by the conveying screw 504*a* and the conveying screw 504*b*. Then, the developer is supplied by the developing roll 503, and adhered to the sleeve 5031 on a surface of the developing roll 503 to form a layer.

The layered developer adhered to the developing roll 503 is regulated to have a predetermined thickness by the developing doctor 12, and then conveyed to a developing area D, which faces the photoconductor 1, along with rotation of the sleeve 5031.

In the developing area D, toner in the developer is electrostatically attracted to a latent image formed on the photoconductor 1 to perform developing, thereby forming a toner image on the photoconductor 1. The toner image formed on the photoconductor 1 is transferred onto a transfer paper sheet in an image forming apparatus, and fixed onto a transfer paper sheet by a fixing section.

The developing process as described above is repeated, thereby gradually consuming toner contained in a developer in the developer storage section 501. Once reduction of toner is detected by a toner concentration sensor, the developer supplier 220 in the developer supplying device 600 operates to supply a supply developer stored inside the developer storage member 231 in the developer storage container 230 and containing a fresh carrier and fresh toner. The fresh developer supplied into the developer storage section 501 is stirred by the conveying screw 504*a* and the conveying screw 504*b* in the developer storage section 501, and sufficiently mixed with a developer stored before the supply.

By supplying a supply developer from the developer supplying device 600, a carrier is also supplied in a predetermined proportion in addition to toner, and the amount of a developer thus becomes excess in the developer storage section 501.

The developer excess in the developer storage section 501 overflows a regulated height of the developer storage section 501, passes through the discharging pipe 331 in the developer discharging device 700, and is stored in the collecting container 330.

Next, operation of the developer supplier 220 in the embodiment will be described with reference to FIG. 7.

The image forming apparatus 1000 may include the developer supplying device 600, which fills, with a supply developer, the developer storage member 231 having an easily deformable shape, draws the supply developer by the screw pump 223, and supplies the supply developer to the developing device 500.

The regulatory section receives from the developing device 500 a signal of shortage of a developer concentration, and thereby starts a developer supply operation. In the developer supply operation, at first, the air supplying unit 260*a* and the air supplying unit 260*b* are each driven to supply air into the developer storage container 230, and simultaneously, the driving motor 226 of the screw pump 223 (see FIG. 9) is driven to draw and convey a developer.

Once the air supplying unit 260*a* and the air supplying unit 260*b* send air, the air penetrates from the air supplying path 261*a* and the air supplying path 261*b* into the air flow path 244*a* and the 244*b* in the nozzle 240, and is supplied from the air supplying port 246*a* the air supplying port 246*b* into the developer storage container 230. The air causes a developer in the developer storage container 230 to be stirred to include much air, thereby facilitating fluidization.

Once air is supplied into the developer storage container 230, inner pressure in the developer storage container 230 would be increased. Accordingly, difference in pressure is generated between inner pressure and outer pressure (atmospheric pressure) of the developer storage container 230, and thereby applying force to the fluidized developer so as to move the developer toward a lower-pressured site. As a result, the developer in the developer storage container 230 would flow out toward a lower-pressured site, i.e., from the developer outflow port 247.

In the present embodiment, suction force by the screw pump 223 also acts to cause a developer in the developer storage container 230 to flow out from the developer outflow port 247.

As described above, the developer flew out from the developer storage container 230 passes from the developer outflow port 247 to the developer flow path 241*a* in the nozzle 240 (see FIG. 8B), and moves via the conveying tube 221 into the screw pump 223. Then, after traveling inside the screw pump 223, the developer drops downward from the developer dropping port 223*b*, and is thereby supplied from the supplying port 15*a* into the developing device 500. Once a certain amount of the developer is completely supplied, the regulatory section stops drive of the air supplying unit 260*a* and the air supplying unit 260*b* as well as the driving motor 226, closes the opening and closing valve 262*a* and the opening and closing valve 262*b*, and thereby finishes the toner supply operation.

As described so far, the opening and closing valve 262*a* and the opening and closing valve 262*b* are closed at the end of a toner supply operation, thereby preventing toner in the developer storage container 230 from passing through the air flow path 244*a* and the air flow path 244*b* in the nozzle 240 and flowing back toward the air supplying unit 260*a* and the air supplying unit 260*b*.

The supply of air supplied from the air supplying unit 260*a* and the air supplying unit 260*b* is set to be less than the suction of toner and air by the screw pump 223. Accordingly, as toner is consumed, the developer storage container 230 has reduced inner pressure.

In addition, the developer storage member 231 in the developer storage container 230 in the embodiment is formed of a soft sheet material, and thus reduces in volume among with reduction in inner pressure.

Figure 10:
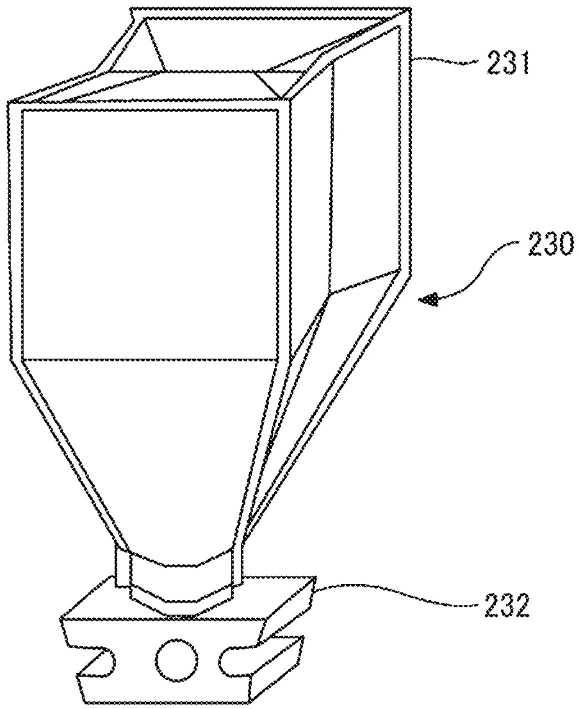
FIG. 10 is a perspective view of a developer storage according to an embodiment of the present invention in a state of being filled with a developer.

FIG. 10 is a perspective view of the developer storage member 231 in a state of being filled with a developer.

Figure 11:
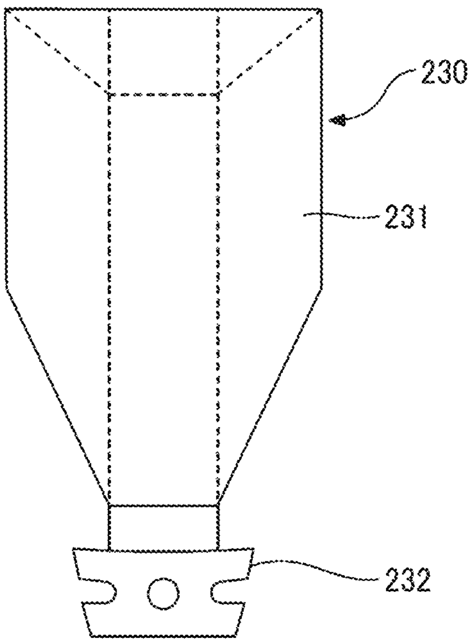
FIG. 11 is a front view of a developer storage according to an embodiment of the present invention in a state where a developer inside the developer storage is discharged and reduced in volume.

FIG. 11 is a front view of the developer storage member 231 in a state where a developer inside the developer storage member 231 is discharged and reduced in volume (deflated). The developer storage member 231 is desirably reduced in volume (reduced in capacity) by 60% or more.

Inside the developer storage member 231 in the developer storage container 230 as present in FIGS. 10 to 11, a supply developer containing a carrier and toner is stored for being supplied to the developing device 500, as described above.

In the supply developer, the carrier in the supply developer preferably has a weight ratio of 3 wt % or more to less than 30 wt %.

It is preferred that a carrier in the supply developer in the developer storage container 230 have a weight ratio of 3 wt % or more, because it is possible to solve a problem in that a very little amount of the carrier is supplied and thus brings an insufficient effect of the supply. Meanwhile, it is preferred that a carrier in the supply developer in the developer storage container 230 have a weight ratio of less than 30 wt %, because it is possible to solve a problem in that the supply developer is not stably supplied to a developer storage.

In the developing device 500, most of a deteriorate carrier is discharged by the developer discharging device 700. However, it is also not out of the realm of possibility that a part of a deteriorate carrier potentially remains inside the developer storage section 501 for a long period. Moreover, in the image forming apparatus 1000, since less consumption of a developer leads to less exchange amount of a carrier in the developer storage section 501, the carrier may stay in the developer storage section 501 for a longer period.

In the embodiment, since before supply of a supply developer in the developer storage container 230, the same carrier as a carrier used in the supply developer has also been used for a developing-device developer stored in the developer storage section 501. Therefore, in the case of less exchange of a developer, or in the case that a part of a carrier initially stored remains without being discharged from the developer storage section 501, the same mechanism as described above controls deterioration of a carrier in the developer storage section 501, and thereby allows the developer to keep stable electrostatic charge even after long-term use.

EXAMPLES

Examples of the present invention will now be described below, but the scope of the present invention is not limited to such examples. In the following Examples and Comparative Examples, "parts" and "%" refer to "parts by mass" and "mass %", unless otherwise specified.

[Preparation of Aluminum Oxide Surface-Treated with Diantimony Pentaoxide-Doped Tin Oxide]

Using a homomixer, 600 g of aluminum oxide (trade name: Advanced Alumina AA-03, manufactured by Sumitomo Chemical Industry Company, Limited (present Sumitomo Chemical Company, Limited)) was dispersed in pure water to provide 5 liter of an aqueous suspension.

The suspension was warmed to and kept at 80° C. An acid liquid was prepared by dissolving 300 g of tin (IV) chloride ($SnCl_4 \cdot 5H_2O$) and 20 g of antimony pentachloride ($SbCl_5$). While the suspension is being stirred, the acid liquid was added slowly to the suspension, and then the pH was adjusted to 6 with an aqueous sodium hydroxide solution. After stirring for 2 hours, the suspension was filtrated and washed, baked at 600° C. for 3 hours, thereby producing aluminum oxide surface-treated with diantimony pentaoxide-doped tin oxide.

[Preparation of Titanium Oxide Surface-Treated with Diantimony Pentaoxide-Doped Tin Oxide]

Using a homomixer, 600 g of titanium oxide (trade name: KR-270, manufactured by Titan Kogyo, Ltd.) was dispersed in pure water to provide 5 liter of an aqueous suspension. The suspension was warmed to and kept at 80° C. An acid liquid was prepared by dissolving 300 g of tin (IV) chloride ($SnCl_4 \cdot 5H_2O$) and 20 g of antimony pentachloride ($SbCl_5$). While the suspension is being stirred, the acid liquid was added slowly to the suspension, and then the pH was adjusted to 6 with an aqueous sodium hydroxide solution, followed by stirring for 2 hours. The suspension was filtrated and washed, baked at 600° C. for 3 hours, thereby producing titanium oxide surface-treated with diantimony pentaoxide-doped tin oxide.

[Preparation of Aluminum Oxide Surface-Treated with Phosphorus-Doped Tin Oxide]

Using a homomixer, 600 g of aluminum oxide (trade name: Advanced Alumina AA-03, manufactured by Sumitomo Chemical Industry Company, Limited (present Sumitomo Chemical Company, Limited)) was dispersed in pure water to provide 5 liter of an aqueous suspension. The suspension was warmed to and kept at 80° C. An acid liquid was prepared by dissolving 300 g of tin (IV) chloride ($SnCl_4 \cdot 5H_2O$) and 2 g of phosphorus pentoxide. While the suspension is being stirred, the acid liquid was added slowly to the suspension, and then the pH was adjusted to 6 with an aqueous sodium hydroxide solution, followed by stirring for 2 hours. The suspension was filtrated and washed, baked at 600° C. for 3 hours, thereby producing aluminum oxide surface-treated with phosphorus-doped tin oxide.

[Preparation of Aluminum Oxide Surface-Treated with Tungsten-Doped Tin Oxide]

Using a homomixer, 600 g of aluminum oxide (trade name: Advanced Alumina AA-03, manufactured by Sumitomo Chemical Industry Company, Limited (present Sumitomo Chemical Company, Limited)) was dispersed in pure water to provide 5 liter of an aqueous suspension. The suspension was warmed to and kept at 80° C. An acid liquid was prepared by dissolving 300 g of tin (IV) chloride ($SnCl_4 \cdot 5H_2O$) and 30 g of tungsten hexachloride. While the suspension is being stirred, the acid liquid was added slowly to the suspension, and then the pH was adjusted to 6 with an aqueous sodium hydroxide solution, followed by stirring for 2 hours. The suspension was filtrated and washed, baked at 600° C. for 3 hours, thereby producing aluminum oxide surface-treated with tungsten-doped tin oxide.

[Preparation of Carrier 1]

The materials of Resin liquid 1 described below were dispersed for 10 minutes with a homomixer, thereby producing Covering layer forming liquid 1.

Covering layer forming liquid 1 was applied onto a surface of the core material described below at a rate of 30 g/min under an atmosphere at 60° C. with a SPIRA COTA (manufactured by Okada Seiko Co., Ltd.) so as to provide an average thickness of 0.6 μm, and dried to form a covering layer.

The average thickness of the covering layer was adjusted by controlling a liquid volume. Subsequently, the covered core material was baked at 200° C. for 1 hour in an electric furnace, cooled, and then crushed and loosen with a sieve having an opening size of 100 μm, thereby producing Carrier 1.

<Core Material>

Mn ferrite (σ 1000:68 [$Am^2/kg$], average particle diameter: 35 μm, EF-35, manufactured by Powdertech Co., Ltd.)

<Resin Liquid 1>

50 parts by mass of an acrylic resin solution (solid content concentration: 50 mass %; trade name: HITAROID 3001; manufactured by Hitachi Chemical Co., Ltd. (present Resonac Corporation))

150 parts by mass of a silicone resin solution (solid content concentration: 50 mass %; trade name: SR2406; manufactured by Dow Toray Co., Ltd.)

500 parts by mass of toluene 1 part by mass of aminosilane (aminoethyl aminopropyl trimethoxysilane)

80 parts by mass of diantimony trioxide particles (trade name: PATOX-M; manufactured by Nihon Seiko Co., Ltd.)

2 parts by mass of a phosphoric ester-based dispersant (trade name: DISPERBYK-102; manufactured by BYK Japan KK)

3 parts by mass of a silicone-based antifoamer (silicone content: 1 mass %; trade name: DISPARLON 1933; manufactured by Kusumoto Chemicals, Ltd.)

1 part by mass of dibutyltin acetate (silicone cross-linking catalyst; trade name: U-200T15; manufactured by Nitto Chemical Industry Co., Ltd.)

[Preparation of Carrier 2]

Carrier 2 was produced in the same manner as for Carrier 1 in the [Preparation of Carrier 1], except for changing <Resin Liquid 1> to <Resin Liquid 2>.

<Resin Liquid 2>

50 parts by mass of an acrylic resin solution (solid content concentration: 50 mass %; trade name: HITAROID 3001; manufactured by Hitachi Chemical Co., Ltd. (present Resonac Corporation))

150 parts by mass of a silicone resin solution (solid content concentration: 50 mass %; trade name: SR2406; manufactured by Dow Toray Co., Ltd.)

500 parts by mass of toluene 1 part by mass of aminosilane (aminoethyl aminopropyl trimethoxysilane)

80 parts by mass of aluminum oxide surface-treated with diantimony pentaoxide-doped tin oxide (aluminum oxide having diantimony pentaoxide-doped tin oxide on a surface; base particles: aluminum oxide; average equivalent circle diameter: 0.6 μm)

2 parts by mass of a phosphoric ester-based dispersant (trade name: DISPERBYK-102; manufactured by BYK Japan KK)

3 parts by mass of a silicone-based antifoamer (silicone content: 1 mass %; trade name: DISPARLON 1933; manufactured by Kusumoto Chemicals, Ltd.)

1 part by mass of dibutyltin acetate (silicone cross-linking catalyst; trade name: U-200T15; manufactured by Nitto Chemical Industry Co., Ltd.)

[Preparation of Carrier 3]

Carrier 3 was produced in the same manner as for Carrier 1 in the [Preparation of Carrier 1], except for changing <Resin Liquid 1> to <Resin Liquid 3>.

<Resin Liquid 3>

50 parts by mass of an acrylic resin solution (solid content concentration: 50 mass %; trade name: HITAROID 3001; manufactured by Hitachi Chemical Co., Ltd. (present Resonac Corporation))

150 parts by mass of a silicone resin solution (solid content concentration: 50 mass %; trade name: SR2406; manufactured by Dow Toray Co., Ltd.)

500 parts by mass of toluene 1 part by mass of aminosilane (aminoethyl aminopropyl trimethoxysilane)

80 parts by mass of titanium oxide surface-treated with diantimony pentaoxide-doped tin oxide (titanium oxide having diantimony pentaoxide-doped tin oxide on a surface; base particles: titanium oxide; average equivalent circle diameter: 0.9 μm)

2 parts by mass of a phosphoric ester-based dispersant (trade name: DISPERBYK-102; manufactured by BYK Japan KK)

3 parts by mass of a silicone-based antifoamer (silicone content: 1 mass %; trade name: DISPARLON 1933; manufactured by Kusumoto Chemicals, Ltd.)

1 part by mass of dibutyltin acetate (silicone cross-linking catalyst; trade name: U-200T15; manufactured by Nitto Chemical Industry Co., Ltd.)

[Preparation of Carrier 4]

Carrier 4 was produced in the same manner as for Carrier 1 in the [Preparation of Carrier 1], except for changing <Resin Liquid 1> to <Resin Liquid 4>.

<Resin Liquid 4>

50 parts by mass of an acrylic resin solution (solid content concentration: 50 mass %; trade name: HITAROID 3001; manufactured by Hitachi Chemical Co., Ltd. (present Resonac Corporation))

150 parts by mass of a silicone resin solution (solid content concentration: 50 mass %; trade name: SR2406; manufactured by Dow Toray Co., Ltd.)

500 parts by mass of toluene 1 part by mass of aminosilane (aminoethyl aminopropyl trimethoxysilane)

80 parts by mass of aluminum oxide surface-treated with diantimony pentaoxide-doped tin oxide (aluminum oxide having diantimony pentaoxide-doped tin oxide on a surface; base particles: aluminum oxide; average equivalent circle diameter: 0.6 μm)

60 parts by mass of barium sulfate (inorganic particles for a covering layer; average equivalent circle diameter: 0.8 m; trade name: BARIACE B-55, manufactured by Sakai Chemical Industry Co., Ltd.)

2 parts by mass of a phosphoric ester-based dispersant (trade name: DISPERBYK-102; manufactured by BYK Japan KK)

3 parts by mass of a silicone-based antifoamer (silicone content: 1 mass %; trade name: DISPARLON 1933; manufactured by Kusumoto Chemicals, Ltd.)

1 part by mass of dibutyltin acetate (silicone cross-linking catalyst; trade name: U-200T15; manufactured by Nitto Chemical Industry Co., Ltd.)

[Preparation of Carrier 5]

Carrier 5 was produced in the same manner as for Carrier 1 in the [Preparation of Carrier 1], except for changing <Resin Liquid 1> to <Resin Liquid 5>.

<Resin Liquid 5>

50 parts by mass of an acrylic resin solution (solid content concentration: 50 mass %; trade name: HITAROID 3001; manufactured by Hitachi Chemical Co., Ltd. (present Resonac Corporation))

150 parts by mass of a silicone resin solution (solid content concentration: 50 mass %; trade name: SR2406; manufactured by Dow Toray Co., Ltd.)

500 parts by mass of toluene 1 part by mass of aminosilane (aminoethyl aminopropyl trimethoxysilane)

80 parts by mass of aluminum oxide surface-treated with diantimony pentaoxide-doped tin oxide (aluminum oxide having diantimony pentaoxide-doped tin oxide on a surface; base particles: aluminum oxide; average equivalent circle diameter: 0.6 μm)

60 parts by mass of aluminum oxide particles (inorganic particles for a covering layer; average equivalent circle diameter: 0.4 μm, trade name: Advanced Alumina AA-03, manufactured by Sumitomo Chemical Industry Company, Limited (present Sumitomo Chemical Company, Limited))

2 parts by mass of a phosphoric ester-based dispersant (trade name: DISPERBYK-102; manufactured by BYK Japan KK)

3 parts by mass of a silicone-based antifoamer (silicone content: 1 mass %; trade name: DISPARLON 1933; manufactured by Kusumoto Chemicals, Ltd.)

1 part by mass of dibutyltin acetate (silicone cross-linking catalyst; trade name: U-200T15; manufactured by Nitto Chemical Industry Co., Ltd.)

[Preparation of Carrier 6]

Carrier 6 was produced in the same manner as for Carrier 1 in the [Preparation of Carrier 1], except for changing <Resin Liquid 1> to <Resin Liquid 6>.

<Resin Liquid 6>

50 parts by mass of an acrylic resin solution (solid content concentration: 50 mass %; trade name: HITAROID 3001; manufactured by Hitachi Chemical Co., Ltd. (present Resonac Corporation))

150 parts by mass of a silicone resin solution (solid content concentration: 50 mass %; trade name: SR2406; manufactured by Dow Toray Co., Ltd.)

500 parts by mass of toluene 1 part by mass of aminosilane (aminoethyl aminopropyl trimethoxysilane)

80 parts by mass of aluminum oxide surface-treated with diantimony pentaoxide-doped tin oxide (aluminum oxide having diantimony pentaoxide-doped tin oxide on a surface; base particles: aluminum oxide; average equivalent circle diameter: 0.6 μm)

60 parts by mass of silicon carbide particles (inorganic particles for a covering layer; average equivalent circle diameter: 0.9 m; trade name: SSC-A01, manufactured by Shinano Electric Refining Co., Ltd.)

2 parts by mass of a phosphoric ester-based dispersant (trade name: DISPERBYK-102; manufactured by BYK Japan KK)

3 parts by mass of a silicone-based antifoamer (silicone content: 1 mass %; trade name: DISPARLON 1933; manufactured by Kusumoto Chemicals, Ltd.)

1 part by mass of dibutyltin acetate (silicone cross-linking catalyst; trade name: U-200T15; manufactured by Nitto Chemical Industry Co., Ltd.)

[Preparation of Carrier 7]

Carrier 7 was produced in the same manner as for Carrier 1 in the [Preparation of Carrier 1], except for changing <Resin Liquid 1> to <Resin Liquid 7>.

<Resin Liquid 7>

50 parts by mass of an acrylic resin solution (solid content concentration: 50 mass %; trade name: HITAROID 3001; manufactured by Hitachi Chemical Co., Ltd. (present Resonac Corporation))

150 parts by mass of a silicone resin solution (solid content concentration: 50 mass %; trade name: SR2406; manufactured by Dow Toray Co., Ltd.)

500 parts by mass of toluene 1 part by mass of aminosilane (aminoethyl aminopropyl trimethoxysilane)

80 parts by mass of aluminum oxide surface-treated with tungsten-doped tin oxide (aluminum oxide having tungsten-doped tin oxide on a surface, base particles: aluminum oxide, average equivalent circle diameter: 0.7 μm)

2 parts by mass of a phosphoric ester-based dispersant (trade name: DISPERBYK-102; manufactured by BYK Japan KK)

3 parts by mass of a silicone-based antifoamer (silicone content: 1 mass %; trade name: DISPARLON 1933; manufactured by Kusumoto Chemicals, Ltd.)

1 part by mass of dibutyltin acetate (silicone cross-linking catalyst; trade name: U-200T15; manufactured by Nitto Chemical Industry Co., Ltd.)

[Preparation of Carrier 8]

Carrier 8 was produced in the same manner as for Carrier 1 in the [Preparation of Carrier 1], except for changing <Resin Liquid 1> to <Resin Liquid 8>.

<Resin Liquid 8>

50 parts by mass of an acrylic resin solution (solid content concentration: 50 mass %; trade name: HITAROID 3001; manufactured by Hitachi Chemical Co., Ltd. (present Resonac Corporation))

150 parts by mass of a silicone resin solution (solid content concentration: 50 mass %; trade name: SR2406; manufactured by Dow Toray Co., Ltd.)

500 parts by mass of toluene 1 part by mass of aminosilane (aminoethyl aminopropyl trimethoxysilane)

80 parts by mass of aluminum oxide surface-treated with tungsten-doped tin oxide (aluminum oxide having tungsten-doped tin oxide on a surface, base particles: aluminum oxide, average equivalent circle diameter: 0.7 μm)

60 parts by mass of barium sulfate (inorganic particles for a covering layer; average equivalent circle diameter: 0.7 μm)

2 parts by mass of a phosphoric ester-based dispersant (trade name: DISPERBYK-102; manufactured by BYK Japan KK)

3 parts by mass of a silicone-based antifoamer (silicone content: 1 mass %; trade name: DISPARLON 1933; manufactured by Kusumoto Chemicals, Ltd.)

1 part by mass of dibutyltin acetate (silicone cross-linking catalyst; trade name: U-200T15; manufactured by Nitto Chemical Industry Co., Ltd.)

[Preparation of Carrier 9]

Carrier 9 was produced in the same manner as for Carrier 1 in the [Preparation of Carrier 1], except for changing <Resin Liquid 1> to <Resin Liquid 9>.

<Resin Liquid 9>

50 parts by mass of an acrylic resin solution (solid content concentration: 50 mass %; trade name: HITAROID 3001; manufactured by Hitachi Chemical Co., Ltd. (present Resonac Corporation))

150 parts by mass of a silicone resin solution (solid content concentration: 50 mass %; trade name: SR2406; manufactured by Dow Toray Co., Ltd.)

500 parts by mass of toluene 1 part by mass of aminosilane (aminoethyl aminopropyl trimethoxysilane)

80 parts by mass of aluminum oxide surface-treated with phosphorus-doped tin oxide (aluminum oxide having phosphorus-doped tin oxide on a surface; base particles: aluminum oxide; average equivalent circle diameter: 0.9 μm)

2 parts by mass of a phosphoric ester-based dispersant (trade name: DISPERBYK-102; manufactured by BYK Japan KK)

3 parts by mass of a silicone-based antifoamer (silicone content: 1 mass %; trade name: DISPARLON 1933; manufactured by Kusumoto Chemicals, Ltd.)

1 part by mass of dibutyltin acetate (silicone cross-linking catalyst; trade name: U-200T15; manufactured by Nitto Chemical Industry Co., Ltd.)

[Preparation of Carrier 10]

Carrier 10 was produced in the same manner as for Carrier 1 in the [Preparation of Carrier 1], except for changing <Resin Liquid 1> to <Resin Liquid 10>.

<Resin Liquid 10>

50 parts by mass of an acrylic resin solution (solid content concentration: 50 mass %; trade name: HITAROID 3001; manufactured by Hitachi Chemical Co., Ltd. (present Resonac Corporation))

150 parts by mass of a silicone resin solution (solid content concentration: 50 mass %; trade name: SR2406; manufactured by Dow Toray Co., Ltd.)

500 parts by mass of toluene 1 part by mass of aminosilane (aminoethyl aminopropyl trimethoxysilane)

80 parts by mass of aluminum oxide surface-treated with phosphorus-doped tin oxide (aluminum oxide having phosphorus-doped tin oxide on a surface; base particles: aluminum oxide; average equivalent circle diameter: 0.9 μm)

60 parts by mass of barium sulfate (inorganic particles for a covering layer; average equivalent circle diameter: 0.8 μm)

2 parts by mass of a phosphoric ester-based dispersant (trade name: DISPERBYK-102; manufactured by BYK Japan KK)

3 parts by mass of a silicone-based antifoamer (silicone content: 1 mass %; trade name: DISPARLON 1933; manufactured by Kusumoto Chemicals, Ltd.)

1 part by mass of dibutyltin acetate (silicone cross-linking catalyst; trade name: U-200T15; manufactured by Nitto Chemical Industry Co., Ltd.)

[Preparation of Carrier 11]

Carrier 11 was produced in the same manner as for Carrier 1 in the [Preparation of Carrier 1], except for changing <Resin Liquid 1> to <Resin Liquid 11>.

<Resin Liquid 11>

50 parts by mass of an acrylic resin solution (solid content concentration: 50 mass %; trade name: HITAROID 3001; manufactured by Hitachi Chemical Co., Ltd. (present Resonac Corporation))

150 parts by mass of a silicone resin solution (solid content concentration: 50 mass %; trade name: SR2406; manufactured by Dow Toray Co., Ltd.)

500 parts by mass of toluene 1 part by mass of aminosilane (aminoethyl aminopropyl trimethoxysilane)

60 parts by mass of aluminum oxide particles (inorganic particles for a covering layer; average equivalent circle diameter: 0.4 μm, trade name: Advanced Alumina AA-03, manufactured by Sumitomo Chemical Industry Company, Limited (present Sumitomo Chemical Company, Limited))

2 parts by mass of a phosphoric ester-based dispersant (trade name: DISPERBYK-102; manufactured by BYK Japan KK)

3 parts by mass of a silicone-based antifoamer (silicone content: 1 mass %; trade name: DISPARLON 1933; manufactured by Kusumoto Chemicals, Ltd.)

1 part by mass of dibutyltin acetate (silicone cross-linking catalyst; trade name: U-200T15; manufactured by Nitto Chemical Industry Co., Ltd.)

[Preparation of Toner]

Toner was prepared according to the following process.

——Synthesis of Polyester Resin A——

Into a reactor equipped with a cooling tube, a stirrer, and a nitrogen-introducing tube, 65 parts of a 1:2 molar adduct of bisphenol A/ethylene oxide, 86 parts of a 1:3 molar adduct of bisphenol A/propylene oxide, 274 parts of terephthalic acid, and 2 parts of dibutyl tin oxide were charged, reacted at 230° C. under normal pressure for 15 hours, and then reacted under a reduced pressure of 5 to 10 mm Hg for 6 hours to synthesize Polyester resin A.

Polyester resin A, thus obtained, had a number average molecular weight (Mn) of 2,300, a weight average molecular weight (Mw) of 8,000, a glass transition temperature (Tg) of 58° C., an acid value of 25 mg KOH/g, and a hydroxyl value of 35 mg KOH/g.

——Synthesis of Prepolymer (Polymer Reactive to Active Hydrogen Group-Containing Compound)——

Into a reaction vessel equipped with a cooling tube, a stirrer, and a nitrogen-introducing tube, 682 parts of a 1:2 molar adduct of bisphenol A/ethylene oxide, 81 parts of 1:2 molar adduct of bisphenol A/propylene oxide, 283 parts of terephthalic acid, 22 parts of trimellitic anhydride, and 2 parts of dibutyl tin oxide were charged, reacted at 230° C. under normal pressure for 8 hours, and then reacted under a reduced pressure of 10 to 15 mm Hg for 5 hours to synthesize an intermediate polyester.

The intermediate polyester thus obtained had a number average molecular weight (Mn) of 2,100, a weight average molecular weight (Mw) of 9,600, a glass transition temperature (Tg) of 55° C., an acid value of 0.5, and a hydroxyl value of 49.

Subsequently, into a reaction vessel equipped with a cooling tube, a stirrer, and a nitrogen-introducing tube, 411 parts of the intermediate polyester, 89 parts of isophorone diisocyanate, and 500 parts of ethyl acetate were charged, and reacted at 100° C. for 5 hours to synthesize a prepolymer (a polymer reactive to an active hydrogen group-containing compound).

The content of free isocyanate in the prepolymer thus obtained was 1.60 mass %, and the solid content concentration of the prepolymer (after leaving at 150° C. for 45 minutes) was 50 mass %.

——Synthesis of Ketimine (Active Hydrogen Group-Containing Compound)——

Into a reaction vessel equipped with a stirring bar and a thermometer, 30 parts of isophorone diamine and 70 parts of methyl ethyl ketone were charged, and reacted at 50° C. for 5 hours to synthesize a ketimine compound (active hydrogen group-containing compound).

The ketimine compound (active hydrogen group-containing compound) thus obtained had an amine value of 423.

——Production of Masterbatch——

Using a Henschel mixer (manufactured by Nippon Coke & Engineering Co., Ltd.), 1,000 parts of water, 540 parts of carbon black PRINTEX 35 (manufactured by Degussa-Hüls AG) (DBP oil absorption: 42 mL/100 g, pH: 9.5), and 1,200 parts of Polyester resin A were mixed. Then, the mixture thus obtained was kneaded at 150° C. for 30 minutes with a twin roller, rolled and cooled, and pulverized with a pulverizer (manufactured by Hosokawa Micron Corporation) to produce a masterbatch.

——Preparation of Aqueous Medium——

A mixture of 306 parts of ion-exchanged water, 265 parts of a 10 mass % suspension of tricalcium phosphate, and 1.0 part of sodium dodecylbenzene sulfonate are stirred and uniformly dissolved to prepare an aqueous medium.

Using the surface tension meter Sigma (manufactured by KSV Instruments Ltd.), analysis was performed with an analysis program in Sigma system. Sodium dodecylbenzene sulfonate was dropped by 0.01% into the aqueous medium, stirred, left to stand, and then measured for interfacial tension.

From the surface tension curve thus obtained, a concentration where interfacial tension is not reduced even by dropping sodium dodecylbenzene sulfonate was calculated as a critical micelle concentration. Note that the critical micelle concentration of sodium dodecylbenzene sulfonate relative to an aqueous medium was 0.05% relative to the mass of the aqueous medium.

——Preparation of Toner Material Liquid——

Into a beaker, 70 parts of Polyester resin A, 10 parts of prepolymer, and 100 parts of ethyl acetate were charged, and stirred to be dissolved. As release agents, 5 parts of paraffin wax (trade name: HNP-9, manufactured by Nippon Seiro Co., Ltd., melting point: 75° C.), 2 parts of MEK-ST (manufactured by Nissan Chemical Industries, Ltd.), and 10 parts of the masterbatch were added. Using a bead mill named ULTRAVISCO MILL (manufactured by IMEX Co., Ltd.), the mixture was passed three times under conditions at a liquid delivery rate of 1 kg/hr and a disc circumferential speed of 6 m/sec and in presence of zirconia beads having a particle diameter of 0.5 mm and filling 80% in volume, and 2.7 parts of ketimine was added and dissolved, thereby preparing a toner material liquid.

——Preparation of Emulsion or Dispersion Liquid——

Into a container, 150 parts of an aqueous medium phase was charged, stirred at a rotation frequency of 12,000 rpm with a TK-type homomixer (manufactured by Tokushu Kika Kogyo Co., Ltd. (present PRIMIX Corporation)), followed by addition of 100 parts of a toner material liquid, and mixed for 10 minutes to prepare an emulsion or dispersion liquid (emulsion slurry).

——Removal of Organic Solvent——

Into a flask equipped with a stirrer and a thermometer, 100 parts of the emulsion slurry was charged, desolventized at 30° C. for 12 hours with stirring at a stirring circumferential speed of 20 m/min, thereby preparing a dispersion slurry.

——Washing——

After filtration of 100 parts of the dispersion slurry under reduced pressure, 100 parts of ion-exchanged water was added to the filter cake thus obtained, mixed by a TK-type homomixer (at a rotation frequency of 12,000 rpm for 10 minutes), and filtrated.

An operation including addition of 300 parts of ion-exchanged water to the filter cake thus obtained, mixing by a TK-type homomixer (at a rotation frequency of 12,000 rpm for 10 minutes), and then filtration was performed twice.

To the filter cake thus obtained, 20 parts of a 10 mass % aqueous sodium hydroxide solution was added, mixed by a TK-type homomixer (at a rotation frequency of 12,000 rpm for 30 minutes), and then filtrated under reduced pressure.

To the filter cake thus obtained, 300 parts of ion-exchanged water was added, mixed by a TK-type homomixer (at a rotation frequency of 12,000 rpm for 10 minutes), and then filtrated under reduced pressure.

An operation including addition of 300 parts of ion-exchanged water to the filter cake thus obtained, mixing by a TK-type homomixer (at a rotation frequency of 12,000 rpm for 10 minutes), and then filtration was performed twice.

To the filter cake thus obtained, 20 parts of 10 mass % hydrochloric acid was added, mixed by a TK-type homomixer (at a rotation frequency of 12,000 rpm for 10 minutes), and then filtrated under reduced pressure.

——Adjustment of Amount of Surfactant——

To the filter cake obtained by washing, 300 parts of ion-exchanged water was added, mixed by a TK-type homomixer (at a rotation frequency of 12,000 rpm for 10 minutes) and subjected to measurement of electrical conductivity of a toner dispersion liquid, and the concentration of sodium dodecylbenzene sulfonate in the toner dispersion liquid was calculated from a calibration curve of the concentration of sodium dodecylbenzene sulfonate preliminarily drawn. Ion-exchanged water was added so as to provide a concentration of sodium dodecylbenzene sulfonate of 0.05%, thereby producing a toner dispersion liquid.

——Surface Treatment Process——

A toner dispersion liquid adjusted to have a predetermined concentration of sodium dodecylbenzene sulfonate was heated at a heating temperature T1=55° C. for 10 hours in a water bath with stirring at 5000 rpm by a TK-type homomixer.

Subsequently, the toner dispersion liquid was cooled to 25° C. and filtrated. To the filter cake thus obtained, 300 parts of ion-exchanged water was added, mixed by a TK-type homomixer (at a rotation frequency of 12,000 rpm for 10 minutes), and then filtrated.

——Drying——

The final filter cake thus obtained was dried with a circulation drier at 45° C. for 48 hours, and sieved with a mesh having an opening size of 75 μm, thereby producing toner matrix particles.

——External Addition——

Relative to 100 parts of toner matrix particles, 1.0 part of titanium oxide with an average particle diameter of 20 nm (SMT-150AI, manufactured by Teyca Corporation) and 1.5 parts of hydrophobic silica micropowder with an average particle diameter of 15 nm (HDK H2000, manufactured Asahi Kasei Corporation) were mixed with a Henschel mixer to produce toner.

Examples 1 to 6 and Comparative Examples 1 to 7

Carriers 1 to 10 described above were mixed with the toner so as to provide a toner concentration of 7% in a developer, thereby preparing each developer. The developer thus obtained was set at the position of a black station in a production printer that is a device to supply a developer to a developing device to perform developing with discharging an excess of a developer (RICOH Pro C7210S, manufactured by Ricoh Co., Ltd.)

In Examples 1 to 6, and Comparative Examples 1 to 4 and 7, a toner bottle, which is a developer storage unit, was filled with a supply developer. The supply developer was adjusted to provide toner with a content of 25 parts by mass relative to 1 part by mass of a carrier.

Comparative Examples 5 to 6 used a printer that includes a toner bottle filled with only toner and has a disabled mechanism to discharge an excess of a developer.

[Evaluation of Adhesion of Carrier]

The printer described above was used to output 200,000 sheets of a black image with an image area ratio of 1% in A4 size, and then output 10 sheets of a full solid image in A4 size, and the average number was counted for carrier deposition. Evaluation was made in accordance with the following evaluation criteria. Grade "+" or more indicates falling within a range applicable in practical use. The results are presented in Tables 1 to 3.

——Evaluation Criteria——

+++: 0

++: 1 or more to 3 or less

+: 4 or more to 10 or less

−: 11 or more

[Evaluation of Image Fog]

The printer described above was used to output 200,000 sheets of a black image with an image area ratio of 50% in A4 size, and then output 10 sheets of a full solid image (4 cm square) in A4 size, and a blank area was observed. Evaluation was made in accordance with the following evaluation criteria. Grade "+" or more indicates falling within a range applicable in practical use. The results are presented in Tables 1 to 3.

——Evaluation Criteria——

+++: No toner is observed in a blank area even in observation with a magnifying glass.

++: A slight amount of toner is observed in a blank area in observation with a magnifying glass.

+: Toner is not observed visually in a blank area, but a large amount of toner is observed in a blank area in observation with a magnifying glass.

−: Toner is observed visually in a blank area.

[Evaluation of Scattering of Toner]

The printer described above was used to output 200,000 sheets of a black image with an image area ratio of 50% in A4 size, and then an amount of toner accumulating in the vicinity of a developer vessel was aspirated and collected to measure the mass of the toner. Evaluation was made in accordance with the following evaluation criteria. Grade "+" or more indicates falling within a range applicable in practical use. The results are presented in Tables 1 to 3.

——Evaluation Criteria——

+++: 0 mg or more to less than 100 mg

++: 100 mg or more to less than 200 mg

+: 200 mg or more to less than 500 mg

−: 500 mg or more

[Evaluation of Image Uniformity]

The printer described above was used to output 200,000 sheets of a black image with an image area ratio of 50% in A4 size, and then output 10 sheets of a full solid image (4 cm square) in A4 size, and an edge of the image was observed. Evaluation was made in accordance with the following evaluation criteria. Grade "++" or more indicates falling within a range applicable in practical use. The results are presented in Tables 1 to 3.

——Evaluation Criteria——

+++: Uniform

+: Slightly dark in an edge

−: Dark in an edge

TABLE 1

| | | | | Example | | | | | |
|---|---|---|---|---|---|---|---|---|---|
| | | | | 1 | 2 | 3 | 4 | 5 | 6 |
| | | Carrier | | 1 | 2 | 3 | 4 | 5 | 6 |
| Covering layer forming liquid | Antimony-containing particles | Diantimony trioxide | | 80 | — | — | — | — | — |
| | | Diantimony pentaoxide-doped tin oxide | | — | 80 | 80 | 80 | 80 | 80 |
| | | Inorganic microparticles for covering layer | Barium sulfate | — | — | — | 60 | — | — |
| | | | Alumina | — | — | — | — | 60 | |
| | | | Silicon carbide | — | — | — | — | — | 60 |
| | Other particles | Tungsten-doped tin oxide | | — | — | — | — | — | — |
| | | Phosphorus-doped tin oxide | | — | — | — | — | — | — |
| | | Base particles | | None | Al oxide | Ti oxide | Al oxide | Al oxide | Al oxide |
| | Other component | Acrylic resin solution (solid content: 50 mass %) | | 50 | 50 | 50 | 50 | 50 | 50 |
| | | Silicone resin solution (solid content: 50 mass %) | | 150 | 150 | 150 | 150 | 150 | 150 |
| | | Toluene | | 500 | 500 | 500 | 500 | 500 | 500 |
| | | Aminosilane | | 1 | 1 | 1 | 1 | 1 | 1 |
| | | Phosphoric ester-based dispersant | | 2 | 2 | 2 | 2 | 2 | 2 |
| | | Silicone-based antifoamer | | 3 | 3 | 3 | 3 | 3 | 3 |
| | | Dibutyltin acetate | | 1 | 1 | 1 | 1 | 1 | 1 |
| | | Carrier replenishment | | Yes | Yes | Yes | Yes | Yes | Yes |
| Evaluation | | Adhesion of carrier | | +++ | +++ | +++ | +++ | +++ | +++ |
| | | Image fog | | +++ | +++ | ++ | +++ | +++ | ++ |
| | | Scattering of toner | | ++ | ++ | ++ | +++ | ++ | ++ |
| | | Image uniformity | | ++ | +++ | +++ | +++ | +++ | +++ |

TABLE 2

| | | | | Comparative Example | | | |
|---|---|---|---|---|---|---|---|
| | | | | 1 | 2 | 3 | 4 |
| | | Carrier | | 7 | 8 | 9 | 10 |
| Covering layer forming liquid | Antimony-containing particles | Diantimony trioxide | | — | — | — | — |
| | | Diantimony pentaoxide-doped tin oxide | | — | — | — | — |
| | | Inorganic microparticles for covering layer | Barium sulfate | — | 60 | — | 60 |
| | | | Alumina | — | — | — | — |
| | | | Silicon carbide | — | — | — | — |
| | Other particles | Tungsten-doped tin oxide | | 80 | 80 | — | — |
| | | Phosphorus-doped tin oxide | | — | — | 80 | 80 |
| | | Base particles | | Al oxide | Al oxide | Al oxide | Al oxide |
| | Other component | Acrylic resin solution (solid content: 50 mass %) | | 50 | 50 | 50 | 50 |
| | | Silicone resin solution (solid content: 50 mass %) | | 150 | 150 | 150 | 150 |
| | | Toluene | | 500 | 500 | 500 | 500 |
| | | Aminosilane | | 1 | 1 | 1 | 1 |
| | | Phosphoric ester-based dispersant | | 2 | 2 | 2 | 2 |
| | | Silicone-based antifoamer | | 3 | 3 | 3 | 3 |
| | | Dibutyltin acetate | | 1 | 1 | 1 | 1 |
| | | Carrier replenishment | | Yes | Yes | Yes | Yes |
| Evaluation | | Adhesion of carrier | | – | – | – | – |
| | | Image fog | | ++ | ++ | ++ | ++ |
| | | Scattering of toner | | ++ | ++ | ++ | ++ |
| | | Image uniformity | | ++ | ++ | ++ | ++ |

TABLE 3

| | | | | Comparative Example | | |
|---|---|---|---|---|---|---|
| | | | | 5 | 6 | 7 |
| | | Carrier | | 2 | 4 | 11 |
| Covering layer forming liquid | Antimony-containing particles | Diantimony trioxide | | — | — | — |
| | | Diantimony pentaoxide-doped tin oxide | | 80 | 80 | — |
| | | Inorganic microparticles for covering layer | Barium sulfate | — | 60 | — |
| | | | Alumina | — | — | 60 |
| | | | Silicon carbide | — | — | — |
| | Other particles | Tungsten-doped tin oxide | | — | — | — |
| | | Phosphorus-doped tin oxide | | — | — | — |
| | | Base particles | | Al oxide | Al oxide | — |
| | Other component | Acrylic resin solution (solid content: 50 mass %) | | 50 | 50 | 50 |
| | | Silicone resin solution (solid content: 50 mass %) | | 150 | 150 | 150 |
| | | Toluene | | 500 | 500 | 500 |
| | | Aminosilane | | 1 | 1 | 1 |
| | | Phosphoric ester-based dispersant | | 2 | 2 | 2 |
| | | Silicone-based antifoamer | | 3 | 3 | 3 |
| | | Dibutyltin acetate | | 1 | 1 | 1 |
| | | Carrier replenishment | | No | No | Yes |
| Evaluation | | Adhesion of carrier | | ++ | ++ | + |
| | | Image fog | | – | – | + |
| | | Scattering of toner | | – | + | – |
| | | Image uniformity | | +++ | +++ | – |

Aspects of the present invention are as follows.

<1>

According to Aspect 1, an image forming method includes: developing an electrostatic latent image formed on an image bearer, with use of a developer containing a carrier and toner, the carrier having a core material particle and a covering layer, the covering layer covering the core material particle and containing an antimony-containing particle; and a carrier supplying the carrier to the developer.

<2>

According to Aspect 2, the image forming method of Aspect 1 further includes discharging an excess of the developer.

<3>

According to Aspect 3, in the image forming method of any of Aspects 1 to 2, the antimony-containing particle contains a base particle being an inorganic particle, and tin oxide doped with antimony.

<4>

According to Aspect 4, in the image forming method of Aspect 3, the base particle is aluminum oxide.

<5>

According to Aspect 5, in the image forming method of any of Aspects 1 to 4, the antimony-containing particle comprises diantimony pentaoxide.

<6>

According to Aspect 6, in the image forming method of any of Aspects 1 to 5, the covering layer contains an inorganic particle other than the antimony-containing particle.

<7>

According to Aspect 7, in the image forming method of Aspect 6, the inorganic particle other than the antimony-containing particle is white.

<8>

According to Aspect 8, in the image forming method of any of Aspects 6 to 7, the inorganic particle other than the antimony-containing particle contains barium sulfate.

<9>

According to Aspect 9, in the image forming method of any of Aspects 6 to 8, the inorganic particle other than the antimony-containing particle consists essentially of barium sulfate.

<10>

According to Aspect 10, a carrier includes a core material particle, and a covering layer covering the core material particle and containing an antimony-containing particle, wherein the carrier is for use in the image forming method according to in any of Aspects 1 to 9.

<11>

According to Aspect 11, a developer includes the carrier according to Aspect 10 and toner.

<12>

According to Aspect 12, an image forming apparatus includes: a developing unit containing a developer to develop an electrostatic latent image formed on an image bearer, with use of the developer, the developer containing a carrier and toner, the carrier having a core material particle and a covering layer, the covering layer covering the core material particle and containing an antimony-containing particle; and a carrier supplying unit configured to supply the carrier to the developer.

The image forming method according to any of Aspects 1 to 9, the carrier according to Aspect 10, the developer according to Aspect 11, and the image forming apparatus according to Aspect 12 can solve various conventional problems and achieve a purpose of the present embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image forming method comprising:

developing an electrostatic latent image formed on an image bearer, with use of a developer containing a carrier and toner, the carrier having a core material particle and a covering layer, the covering layer covering the core material particle and containing an antimony-containing particle, the antimony-containing particle comprising a base particle being an inorganic particle; tin oxide doped with antimony; and diantimony pentaoxide; and supplying the carrier to the developer.

2. The image forming method according to claim 1, further comprising:

discharging an excess of the developer.

3. The image forming method according to claim 1, wherein;

the base particle comprises aluminum oxide.

4. The image forming method according to claim 1, wherein:

the covering layer contains an inorganic particle other than the antimony-containing particle.

5. The image forming method according to claim 4, wherein;

the inorganic particle other than the antimony-containing particle is white.

6. The image forming method according to claim 4, wherein;

the inorganic particle other than the antimony-containing particle comprises barium sulfate.

7. The image forming method according to claim 4, wherein:

the inorganic particle other than the antimony-containing particle consists essentially of barium sulfate.

8. A carrier comprising:

a core material particle; and a covering layer covering the core material particle and containing an antimony-containing particle, the antimony-containing particle comprising a base particle being an inorganic particle; tin oxide doped with antimony; and diantimony pentaoxide, wherein the carrier is for use in the image forming method according to claim 1.

9. A developer comprising:

the carrier according to claim 8; and toner.

10. An image forming apparatus comprising:

a developing structure containing a developer to develop an electrostatic latent image formed on an image bearer, with use of the developer, the developer containing a carrier and toner, the carrier having a core material particle and a covering layer, the covering layer covering the core material particle and containing an antimony-containing particle, the antimony-containing particle comprising a base particle being an inorganic particle; tin oxide doped with antimony; and diantimony pentaoxide; and a carrier supply to supply the carrier to the developer.

11. The image forming method according to claim 1, wherein:

the antimony-containing particle has an average equivalent circle diameter of 500 nm to 1000 nm.

12. The carrier according to claim 8, wherein:

the antimony-containing particle has an average equivalent circle diameter of 500 nm to 1000 nm.

13. The carrier according to claim 8, wherein:

the covering layer comprises a covering layer resin, and a content of the antimony-containing particle is 40 parts by mass to 120 parts by mass relative to 100 parts by mass of the covering layer resin.

14. The carrier according to claim 8, wherein:

the covering layer comprises a covering layer resin, and the covering layer resin comprises a silicone resin and an acrylic resin.

15. The carrier according to claim 8, wherein:

the covering layer has an average thickness of 0.50 um to 1.00 um.

16. The carrier according to claim 8, wherein:

the carrier has a volume average particle diameter of 20 μm to 100 um.

17. The carrier according to claim 8, wherein:

the core material particle comprises Mn ferrite.

18. The carrier according to claim 8, wherein:

an amount of antimony doped in the tin oxide doped with antimony is 0.01 mass % to 5 mass %.

19. The developer according to claim 9, wherein:

a blend amount of the toner in the developer is 2 parts by mass to 50 parts by mass relative to 1 part by mass of the carrier.

20. The image forming method according to claim 1, wherein:

the carrier is supplied to the developer as a supply developer, and the carrier in the supply developer has a weight ratio of 3 wt % to less than 30 wt %.

* * * * *